United States Patent
Hongo et al.

(10) Patent No.: US 10,045,251 B2
(45) Date of Patent: Aug. 7, 2018

(54) METHOD, SYSTEM AND ACCESS POINT

(71) Applicant: FUJITSU LIMITED, Kawasaki-shi, Kanagawa (JP)

(72) Inventors: Naoya Hongo, Kawasaki (JP); Takeshi Ohtani, Kawasaki (JP); Kazuo Sasaki, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 108 days.

(21) Appl. No.: 15/162,926

(22) Filed: May 24, 2016

(65) Prior Publication Data
US 2016/0353320 A1 Dec. 1, 2016

(30) Foreign Application Priority Data
May 26, 2015 (JP) ................. 2015-106395

(51) Int. Cl.
*H04W 28/02* (2009.01)
*H04W 40/24* (2009.01)
*H04L 12/28* (2006.01)
*H04B 17/318* (2015.01)
*H04W 4/02* (2018.01)
(Continued)

(52) U.S. Cl.
CPC ...... *H04W 28/0289* (2013.01); *H04B 17/318* (2015.01); *H04L 12/28* (2013.01); *H04W 4/027* (2013.01); *H04W 36/0077* (2013.01); *H04W 40/244* (2013.01); *H04W 12/06* (2013.01); *H04W 36/30* (2013.01); *H04W 84/12* (2013.01); *H04W 88/08* (2013.01)

(58) Field of Classification Search
CPC ............ H04W 28/0289; H04W 4/027; H04W 36/0077; H04W 40/244; H04W 12/06; H04W 36/30; H04W 84/12; H04W 88/08; H04B 17/318; H04L 12/28
See application file for complete search history.

(56) References Cited

U.S. PATENT DOCUMENTS

2009/0109899 A1 4/2009 Hamada
2014/0120955 A1* 5/2014 Padden ................. H04W 36/00
455/456.6
(Continued)

FOREIGN PATENT DOCUMENTS

JP 2004-140614 5/2004
JP 2009-111768 5/2009
JP 2014-192899 10/2014

*Primary Examiner* — Jae Y Lee
(74) *Attorney, Agent, or Firm* — Staas & Halsey LLP

(57) ABSTRACT

A method includes measuring a first congestion level of the first access point, determining to change a coupling destination of a terminal device from a first access point to a second access point, transmitting a request from the first access point to the plurality of access points, the request from the first access point requesting the plurality of access points other than the second access point not to send a response to a request from the terminal device, the request from the terminal device requesting the plurality of access points to send the response to the terminal device, cutting off a coupling between the first access point and the terminal device, transmitting the request from the terminal device to the plurality of access points, sending the response to the request from the terminal device, and establishing a coupling between the second access point and the terminal device.

19 Claims, 28 Drawing Sheets

(51) Int. Cl.
  *H04W 36/00* (2009.01)
  *H04W 12/06* (2009.01)
  *H04W 88/08* (2009.01)
  *H04W 84/12* (2009.01)
  *H04W 36/30* (2009.01)

(56) References Cited

U.S. PATENT DOCUMENTS

2014/0293790 A1  10/2014  Xiao et al.
2016/0227563 A1* 8/2016  Yilmaz ............. H04W 52/0219
2017/0188271 A1* 6/2017  Van Oost .......... H04W 36/0066

* cited by examiner

FIG. 7

| TERMINAL IDENTIFIER | RECEIVED ELECTROMAGNETIC WAVE STRENGTH |
|---|---|
| aa:aa:aa:00:00:11 | -20dB |
| bb:bb:bb:00:00:22 | -30dB |
| cc:cc:cc:aa:aa:33 | -50dB |

FIG. 8

| TERMINAL IDENTIFIER | CONGESTION LEVEL | RECEIVED ELECTROMAGNETIC WAVE STRENGTH |
|---|---|---|
| aa:bb:cc:dd:11:11 | 40 | -40dB |
| aa:bb:cc:dd:11:22 | 60 | -70dB |
| aa:bb:cc:dd:11:33 | 10 | -30dB |

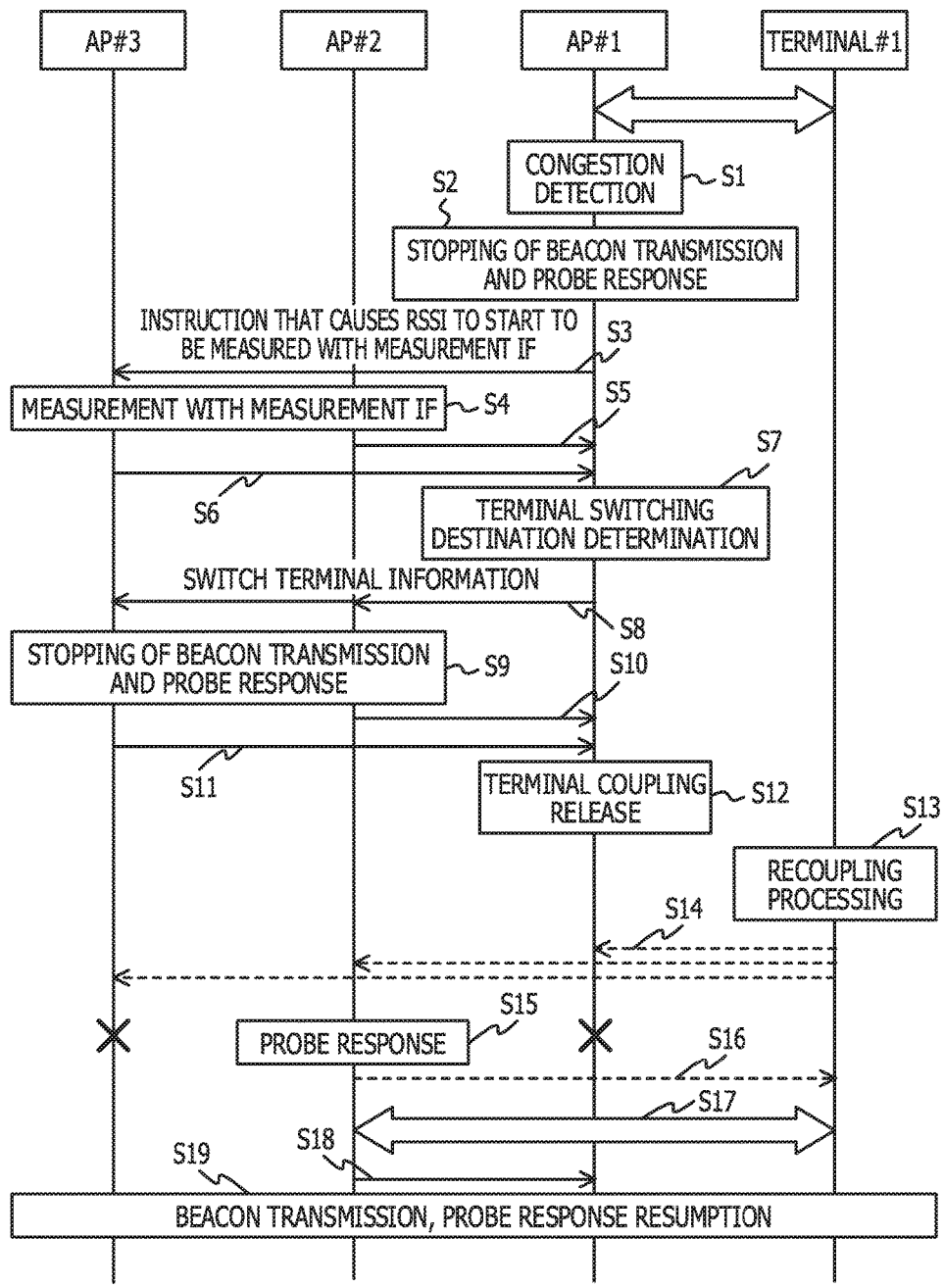

FIG. 13

|  | TERMINAL IDENTIFIER | RECEIVED ELECTROMAGNETIC WAVE STRENGTH | TYPE OF APPLICATION IN USE | AMOUNT OF REMAINING BATTERY POWER |
|---|---|---|---|---|
| TERMINAL #A | aa:aa:aa:00:00:11 | -20dB | VoIP | 60% |
| TERMINAL #B | bb:bb:bb:00:00:22 | -20dB | VIDEO WEBSITE | 80% |
| TERMINAL #C | cc:cc:cc:aa:aa:33 | -50dB | VIDEO WEBSITE | 40% |

FIG. 15

| TIME | RECEIVED ELECTROMAGNETIC WAVE STRENGTH |
|---|---|
| 13:00:02 | -40dB |
| 13:00:05 | -40dB |
| 13:00:07 | -30dB |
| ... | |
| 13:00:40 | -20dB |

FIG. 20

| DAY | PERIOD OF TIME | AVERAGE CONGESTION LEVEL |
|---|---|---|
| TUESDAY | 13:00 TO 13:30 | 10 |
| | 13:30 TO 14:00 | 60 |
| | 14:00 TO 14:30 | 70 |
| | ... | |

FIG. 21

| IDENTIFIER | PRECEDING AVERAGE CONGESTION LEVEL | CURRENT CONGESTION LEVEL | NOTIFICATION CONGESTION LEVEL |
|---|---|---|---|
| AP#1 | 20 | 30 | 10 |
| AP#2 | 70 (AP IS EXPECTED TO BE CONGESTED) | 30 | 40 |
| AP#3 | 30 | 50 (EXCEEDING THRESHOLD) | 50 |

METHOD, SYSTEM AND ACCESS POINT

CROSS-REFERENCE TO RELATED APPLICATION

This application is based upon and claims the benefit of priority of the prior Japanese Patent Application No. 2015-106395, filed on May 26, 2015, the entire contents of which are incorporated herein by reference.

FIELD

The embodiments discussed herein are related to a method, a system, and an access point.

BACKGROUND

In most cases, a wireless communication terminal, such as a smartphone, or a tablet terminal, includes an interface for various wireless communication. The interfaces for wireless communication that are included in the wireless communication terminal include, for example, interfaces such as local area network (LAN), 3rd Generation (3G: a third mobile communication system), and Long Term Evolution (LTE). For example, in the case of the wireless LAN, the wireless communication terminal performs coupling to an access point (AP) in the vicinity, and thus can perform coupling to the Internet or a local network. The wireless communication terminal is simply referred to as a terminal."

Because a reach range of an electromagnetic wave of the AP is several tens of meters, in a case where coverage in a broader range is desired, in most cases, APs are installed at distances of 20 to 30 meters. In a place where a lot of people gather locally such as a sports stadium or a hotel lobby, although the APs are installed at given distances, coupling by terminals is concentrated on a specific AP, and communication speed decreases.

This is due to specifications for terminals in the wireless LAN, which state that a coupling to an AP that has the highest received signal strength indicator (RSSI) is made. The received signal strength indicator is also called a received electromagnetic wave strength. For example, in a case where electromagnetic output strengths of all the APs within the network are the same, the shorter the distance to the terminal is, the stronger the received electromagnetic wave strength of the output electromagnetic wave from the AP becomes. For this reason, a terminal performs coupling to the AP that is positioned the closest to the terminal. Therefore, in a case where a lot of people gather locally, the coupling by the terminals is concentrated on the AP that is positioned the closest to the place where they gather. As a result, an electromagnetic wave occupancy rate per one terminal decreases, and communication speed decreases.

As a method of suppressing the concentration of accesses by terminals to a specific AP, for example, a method is known in which a terminal is caused to acquire a congestion situation of an AP in the vicinity and to perform coupling to an AP that is not congested. Furthermore, in addition, for example, a method is known in which a wireless LAN controller that controls the AP monitors the congestion situation of each AP, coupling by multiple terminals to the AP that is in congestion is released, and thus a load on the AP that is in congestion is alleviated. Moreover, the expression "An AP is in congestion" means that the electromagnetic wave occupancy rate per one terminal that performs coupling to the AP is below a threshold at which the communication speed is maintained to such an extent that a user of the terminal does not feel discomfort. That is, the expression "An AP is in congestion" means that the number of the terminals that perform coupling to the AP or the electromagnetic wave occupancy rate of the AP is a threshold or above.

As examples of the related art, Japanese Laid-open Patent Application Publication No. 2004-140614, Japanese Laid-open Patent Application Publication No. 2014-192899, and Japanese Laid-open Patent Application Publication No. 2009-111768 are known.

SUMMARY

According to an aspect of the invention, a method using a plurality of access points including a first access point and a second access point includes measuring a first congestion level of the first access point coupled to a terminal device, determining, based on the measured first congestion level, to change a coupling destination of the terminal device from the first access point to the second access point, transmitting a first request from the first access point to the plurality of access points, the first request from the first access point requesting the plurality of access points other than the second access point not to send a response to a second request from the terminal device, the second request from the terminal device requesting the plurality of access points to send the response to the terminal device, cutting off a coupling between the first access point and the terminal device, transmitting the second request from the terminal device to the plurality of access points, sending, from the second access point, the response to the second request from the terminal device, and establishing a coupling between the second access point and the terminal device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of a coupling terminal management table;

FIG. 8 is a diagram illustrating an example of a neighboring AP management table;

FIG. 12 is a diagram illustrating an example of a sequence of terminal coupling control processing by the wireless communication network system;

FIG. 13 is a diagram illustrating an example of a coupling terminal management table according to a modification example of the first embodiment;

FIG. 15 is a diagram illustrating an example of an RSSI change history management table;

FIG. 20 is a diagram illustrating an example of an average congestion level history management table;

FIG. 21 is a diagram illustrating an example of a congestion level that is exchanged between an AP #1, an AP #2, and an AP #3 for a period of time from 13:00 to 13:30 on Tuesday;

DESCRIPTION OF EMBODIMENTS

Figure 1:
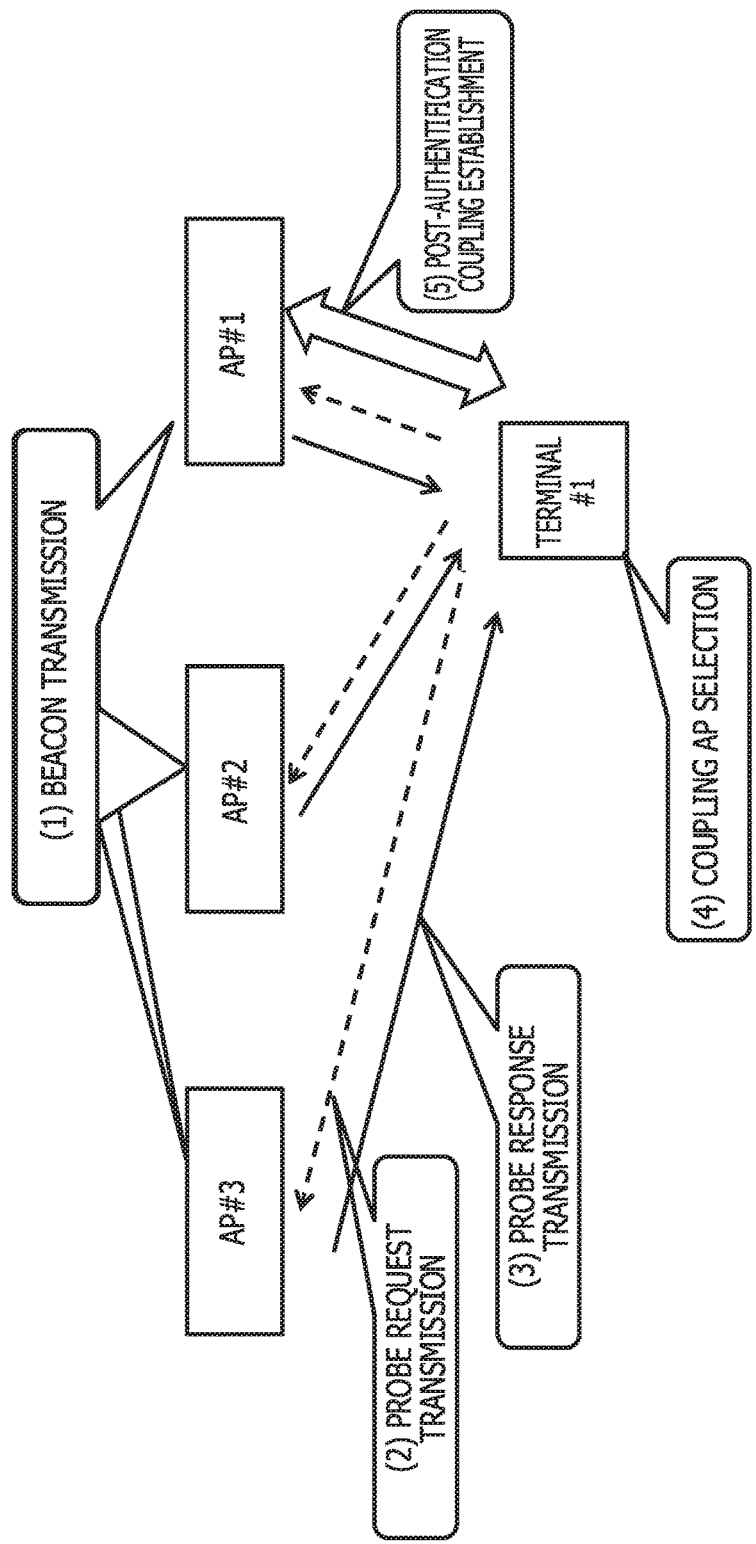
FIG. 1 is a diagram illustrating an example of a flow of all processing up to and including processing that establishes a coupling between a terminal and an AP on a wireless LAN.

A problem with the method in which the terminal is caused to acquire the congestion situation of the AP in the vicinity is as follows. For example, when the terminal does not perform coupling to the AP, the terminal has difficulty in acquiring the congestion situation of the AP in the vicinity. In a case where the terminal does not perform coupling to any AP, first, the terminal performs coupling to the AP, accesses to which are concentrated. Furthermore, for example, the terminal has to be equipped with a function for switching the AP that is a coupling destination, and this is not for a general purpose.

A problem with the method in which the wireless LAN controller controls the number of the terminals that perform coupling to the AP that is in congestion is as follows. For example, the wireless LAN controller does not recognize the received electromagnetic wave strength in the AP in the vicinity of a terminal of an electromagnetic wave transmitted from the terminal that is performing coupling to the AP that is in congestion. For this reason, in a case where a terminal, in the vicinity of which a different coupling-available AP other than the AP that is in congestion is not present, is selected as a terminal that releases the coupling to the AP that is in congestion, there is a likelihood that the terminal will again perform coupling to the same AP after the coupling is released. In this case, an excessive load on the AP that is in congestion is difficult to alleviate.

Moreover, the problem that accesses by the terminals are concentrated on a specific wireless base station is a problem that also occurs in a different wireless communication network, such as the 3G or the LTE, without being limited to the wireless LAN.

Embodiments of the present disclosure will be described in detail below referring to the drawings. Configurations of the embodiments described below are examples, and the present disclosure is not limited to the configurations of the embodiments.

First Embodiment

FIG. 1 is a diagram illustrating an example of a flow of any processing up to and including processing that establishes a coupling between a terminal or an AP on the wireless LAN. In an example that is illustrated in FIG. 1, an AP #1, an AP #2, and an AP #3 are devices under the control of the same manager. The AP #1, the AP #2, and the AP #3 use the same wireless network name. In the wireless LAN, the wireless network name is also referred to as a service set identifier (SSID) or an extended SSID (ESSID). In the present specification, for description convenience, the wireless network names are hereinafter collectively referred to as the SSID.

(1) Each AP transmits a beacon with a given period. The SSID, information on a utilization channel, and the like are included in the beacon. A period of beacon transmission is, for example, approximately 100 milliseconds. Because the beacon is transmitted by broadcasting, the beacon reaches all devices within the reach of an electromagnetic wave.

(2) Because a terminal #1 receives a beacon of the same SSID from the AP #1, the AP #2, and the AP #3, the terminal #1 transmits a probe request with respect to every utilization channel for each AP. The probe request is a request that is made to the AP to check whether or not an SSID that is set for the AP that is connected to the terminal #1 and an SSID of the AP are the same. The probe request is transmitted using a broadcast address. In FIG. 1, in the AP #1, the AP #2, and the AP #3, in order to avoid electromagnetic wave interference, the terminal #1 transmits the probe request three times with respect to the utilization channels because the utilization channels are different.

(3) If the SSIDs are the same, each AP transmits a probe response to the probe request from the terminal #1. The terminal #1 receives the probe response from each AP and thus recognizes the presence of the AP #1, the AP #2, and the AP #3.

(4) Because the terminal #1 performs coupling to one AP, the terminal #1 selects an AP that has the greatest received electromagnetic wave strength from among the AP #1, the AP #2, and the AP #3 from which the probe responses are received. In FIG. 1, the terminal #1 is assumed to be present at a location near the AP #1, and to select the AP #1. (5) Authentication is performed between the terminal #1 and the AP #1, and thereafter a coupling is established.

Figure 2:
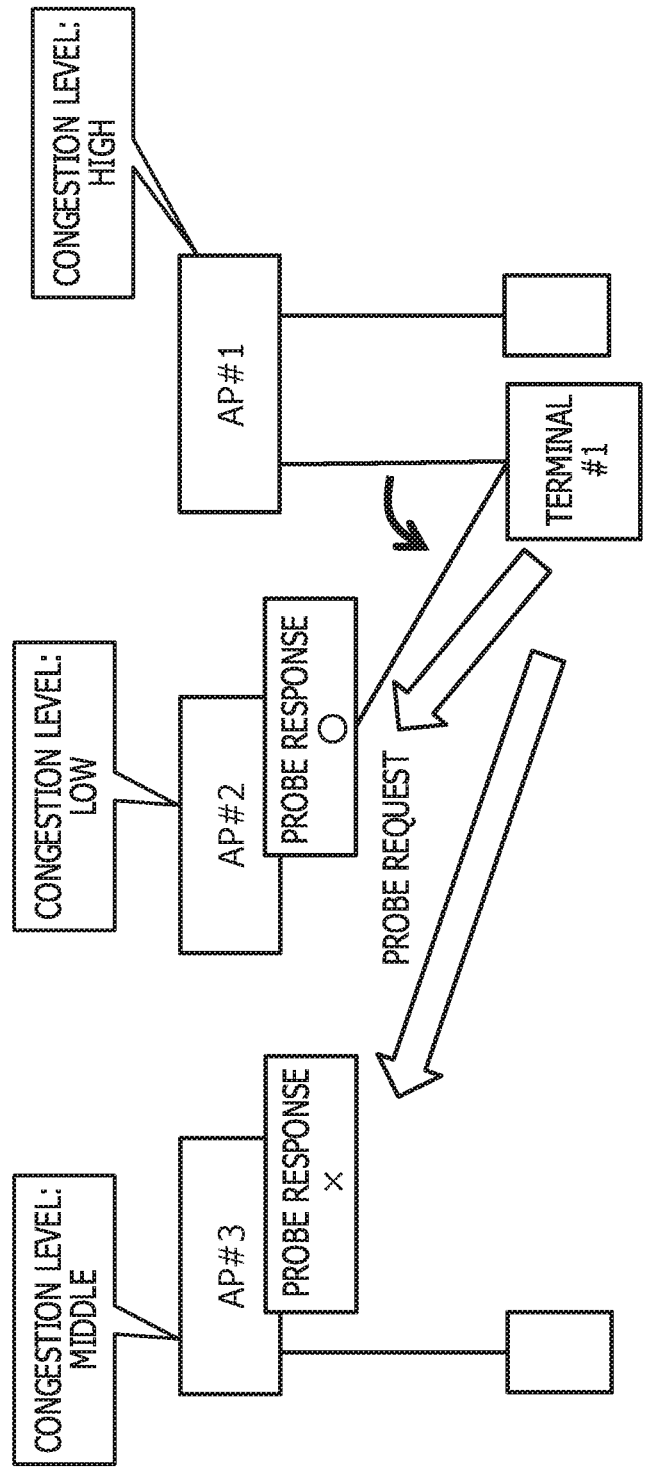
FIG. 2 is a diagram illustrating an example of terminal coupling control processing by an AP according to a first embodiment.

FIG. 2 is a diagram illustrating an example of the terminal coupling control processing by the AP according to a first embodiment. According to the first embodiment, the APs exchange congestion levels indicating congestion situations with one another, and know the congestion situations mutually. In a case where the AP has a congestion level that is higher than a congestion threshold, the AP detects congestion. When the AP detects the congestion, the AP attempts to switch a coupling destination of a terminal that is performing coupling to the AP to a different AP and to alleviate the congestion. Specifically, in a case where the congestion is detected, the AP selects a coupling destination switching target terminal and a different AP, as the next coupling destination of the terminal, that has no congestion. The AP that has a high congestion level is hereinafter referred to as an in-congestion AP. The congestion level is an example of the "congestion situation".

When it comes to the in-congestion AP, because the coupling destination switching target terminal is caused to be connected to an AP that is selected as the next coupling destination, an AP that is not selected is instructed to temporarily stop the response to the probe request. Accordingly, although the coupling destination switching target terminal is disconnected by the in-congestion AP and then that terminal transmits the probe request, the probe response is not transmitted from the AP that is not selected as the next coupling destination. Therefore, the presence of the AP that is not selected is hidden from the coupling destination switching target terminal, and the selected AP is selected, as the coupling destination, for that terminal. Moreover, the in-congestion AP itself temporarily stops the probe response.

In FIG. 2, the AP #1 is the in-congestion AP. Furthermore, the terminal #1 is the coupling destination switching target terminal. In a case where the AP #1 selects the AP #2 as the next coupling destination of the terminal #1, the AP #2 replies to the probe request from the terminal #1. On the other hand, the AP #1 and the AP #3 do not reply to the probe request from the terminal #1. Accordingly, the terminal #1 recognizes the presence of the AP #2, but does not recognize the presence of the AP #1 and the AP #3, leading to performing coupling to the AP #2. The probe request is an example of a "signal from a wireless terminal for checking for the coupling destination".

Figure 3:
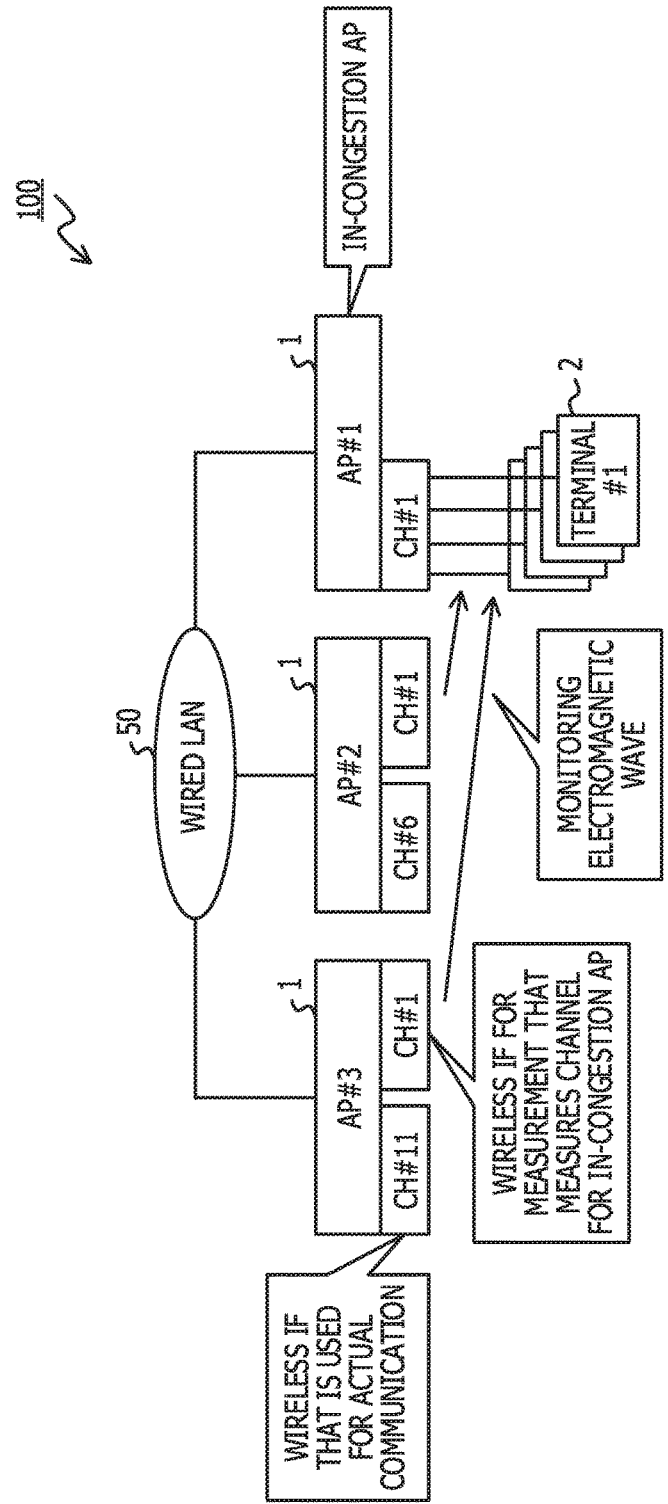
FIG. 3 is a diagram illustrating an example of a configuration of a wireless communication network system according to the first embodiment.

FIG. 3 is a diagram illustrating an example of a configuration of a wireless communication network system 100 according to the first embodiment. The wireless communication network system 100 includes multiple APs 1 and multiple terminals 2. In FIG. 3, for convenience, three APs 1 and four terminals 2 that perform coupling to one of the three APs 1 are illustrated. In a case where the APs and the terminals are not distinguished, the APs and the terminals are collectively expressed as the AP 1 and the terminal 2, respectively. In a case where each of the APs and each of the terminals are specified, as illustrated in the drawings, each of the APs and each of the terminals 2 are individually expressed as an AP #X and a terminal #X (X is a number), respectively.

An AP 1 is performing coupling to a wired LAN 50. The wired LAN 50 is a network for communication between each of the APs 1. The AP 1 has two wireless LAN interfaces, that is, an interface for communication with the terminal 2 and an interface for measuring an electromagnetic wave on the utilization channel for the in-congestion AP. The in-congestion AP instructs the interface of a different AP 1 for measuring the electromagnetic wave to measure a received electromagnetic wave strength, and, based on a result of the measurement of the received electromagnetic wave strength from each AP 1, selects the next coupling destination of that terminal.

Terminal coupling control processing by the AP 1 according to the first embodiment, which is described above, is performed in two phases that result from broad categorization. In the first phase, processing is performed that selects the coupling destination switching target terminal and the AP 1 which is the next coupling destination of that terminal. In the second phase, processing is performed for switching the coupling destination of the coupling destination switching target terminal from the in-congestion AP to the AP 1 that is the next coupling destination.

Figure 4A:
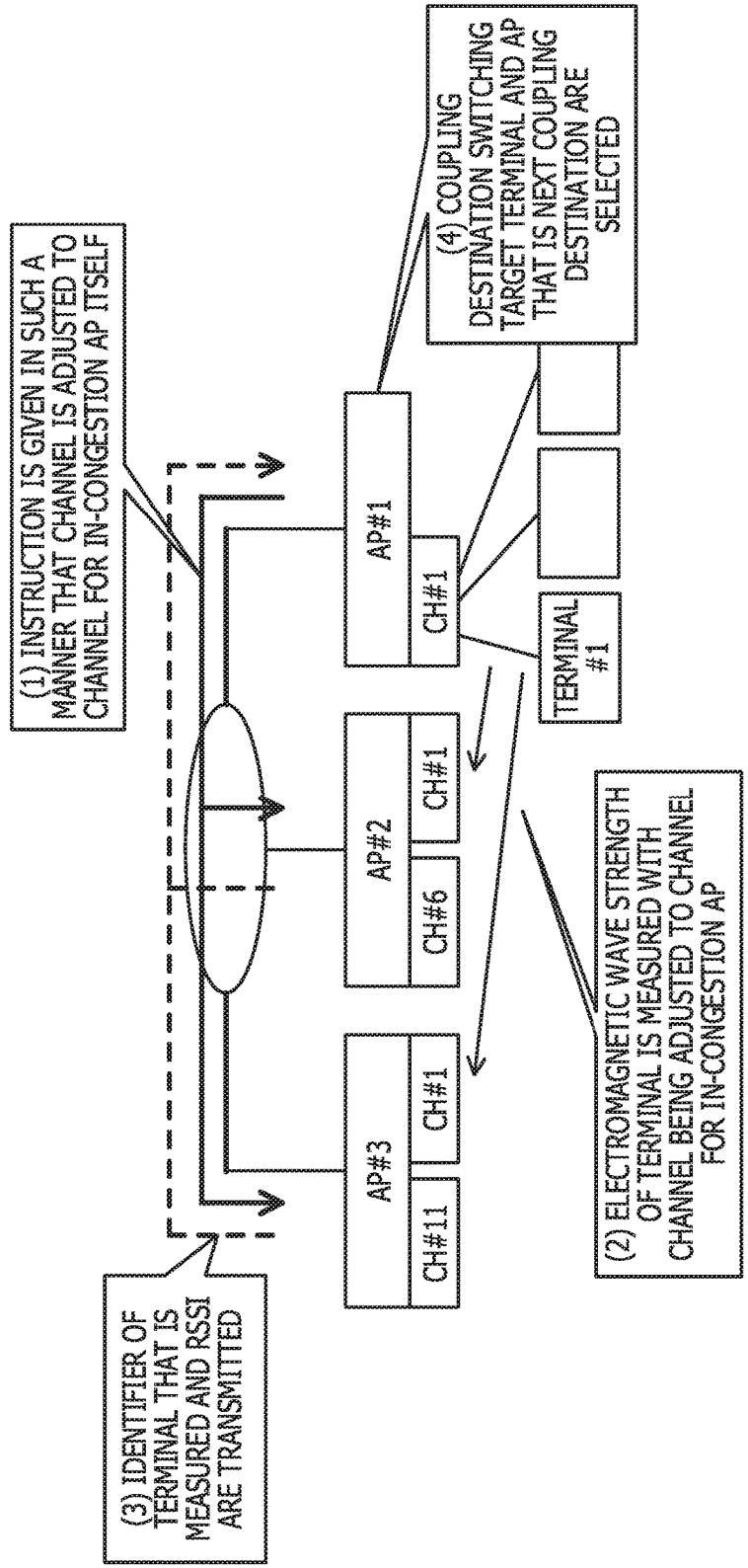
FIG. 4A is a diagram illustrating an example of a flow of first-phase processing of the terminal coupling control processing.

FIG. 4A is a diagram illustrating an example of a flow of the first-phase processing of the terminal coupling control processing. In FIG. 4A, the wireless communication network system 100 in FIG. 3 is illustrated, and it is assumed that the terminal #1 is present at a location where the terminal #1 is able to receive the beacon from any one of the AP #1, the AP #2, and the AP #3. It is assumed that the terminal #1 is performing coupling to the AP #1. The terminal #1 and the AP #1 are assumed to use a channel #1. In FIG. 4A, the AP #1 is the in-congestion AP, which detects that the in-congestion AP itself has become congested.

(1) The congestion AP #1 transmits an instruction to the AP #2 and the AP #3 in such a manner that the AP #2 and the AP #3 start to measure the received electromagnetic wave strength with a channel for the electromagnetic wave measurement interface being adjusted to a channel #1 for the communication interface of the in-congestion AP #1. This instruction is transmitted over a wired network 50.

(2) When receiving the instruction from the congestion AP #1, the AP #2 and the AP #3 each adjust the channel for the electromagnetic wave measurement interface to a utilization channel #1 for the in-congestion AP #1. With the electromagnetic wave measurement interface, the AP #2 and the AP #3 measure the received electromagnetic wave strength on the utilization channel #1 for the in-congestion AP #1. Accordingly, the AP #2 and the AP #3 detect the terminal 2 that performs coupling to the in-congestion AP #1.

(3) The AP #2 and the AP #3 transmit to the in-congestion AP #1 an identifier of a terminal that is detected with the measurement of the received electromagnetic wave strength on the channel #1 and the received electromagnetic wave strength (RSSI). For the identifier of the terminal, for example, any identification information that is uniquely allocated to each terminal, such as an MAC address or a terminal identification number, is used.

(4) The in-congestion AP #1 selects the coupling destination switching target terminal based on the RSSIs of each terminal that are received from the AP #2 and the AP #3. Furthermore, the in-congestion AP #1 selects the AP 1 that is the next coupling destination of the coupling destination switching target terminal, based on the congestion level for each of the AP #2 and the AP #3. For example, the AP 1 that has the lowest congestion level is selected as the next coupling destination of the coupling destination switching target terminal, and based on a result of the measurement by the selected AP 1, the terminal 2 indicating the greatest RSSI is selected as the coupling destination switching target terminal. Moreover, the congestion levels are exchanged between each of the APs 1.

Figure 4B:
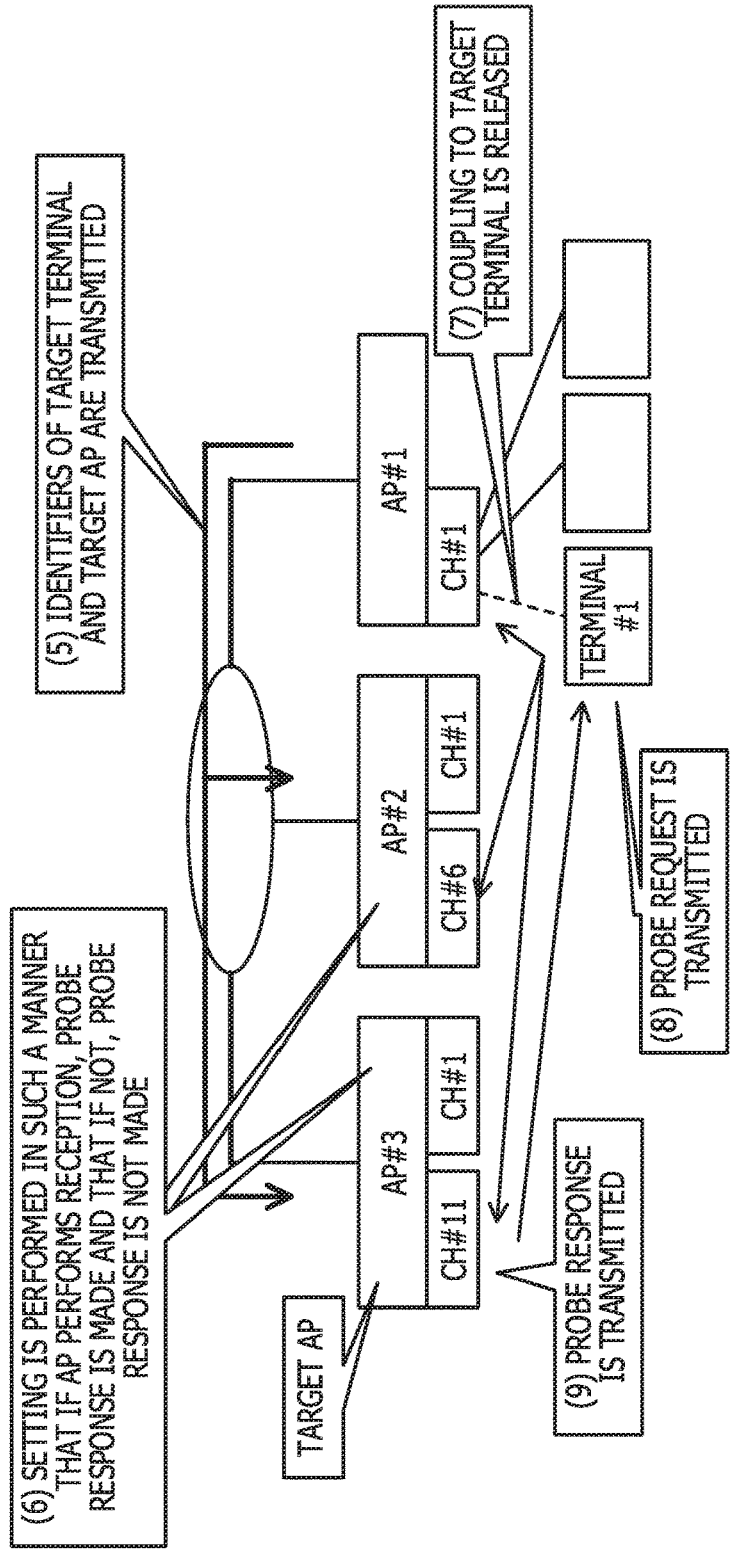
FIG. 4B is a diagram illustrating an example of a flow of second-phase processing of the terminal coupling control processing.

FIG. 4B is a diagram illustrating an example of a flow of the second-phase processing of the terminal coupling control processing. In the first phase, the in-congestion AP #1 is assumed to select the terminal #1 as the coupling destination switching target terminal and the AP #3 as the next coupling destination.

(5) The in-congestion AP #1 transmits information including an identifier of the coupling destination switching target terminal #1 and an identifier of the AP #3 that is the next coupling destination to the AP #2 and the AP #3 over the wired LAN 50. Switch terminal information is also a request for acceptance by the coupling destination switching target terminal of the coupling switching from the in-congestion AP to the AP 1 that is the next coupling destination.

(6) When receiving the switch terminal information, the AP #2 and the AP #3 perform setting of the probe response according to the switch terminal information. The AP #2 is not the AP that is the next coupling destination, and an identifier of the AP #2 is not included in the switch terminal information. For this reason, the AP #2 stops the probe response. Because the AP #3 is the AP that is the next coupling destination, the identifier of the AP #3 is included in the switch terminal information. For this reason, the AP #3 performs setting in such a manner that the probe response to the probe request from the coupling destination switching target terminal #1 is transmitted, and that the probe response to the probe request from a different terminal is not transmitted.

(7) The in-congestion AP #1 releases a coupling to the coupling destination switching target terminal #1. (8) When the coupling is released, the coupling destination switching target terminal #1 transmits the probe request. The probe requests are transmitted over the utilization channel #1 for the AP #1, a utilization channel #6 for the AP #2, and a utilization channel #11 for the AP #3, respectively. The utilization channel for each AP 1 is acquired from the beacon that is transmitted with a given period from each AP 1.

(9) The probe request from the coupling destination switching target terminal #1 reaches any one of the AP #1, the AP #2, and the AP #3. However, the AP # that is the next coupling destination transmits the AP #3 and the AP #1 and the AP #2 do not transmit the probe response. Accordingly, the coupling destination switching target terminal #1 recognizes the presence of the AP #3, but does not recognize the presence of the AP #1 and the AP #2. For this reason, the coupling destination switching target terminal #1 performs processing that performs coupling to the AP #3.

As described above, according to the first embodiment, the in-congestion AP 1 switches the coupling destination of the terminal 2 that is performing coupling to the in-congestion AP 1 itself to a different AP 1 that is not congested, and thus the coupling by the terminals 2 is distributed. Furthermore, the in-congestion AP 1 selects the AP 1 that is the next coupling destination of the coupling destination switching target terminal 2, from among the APs 1 that are not congested. The AP 1 that is the next coupling destination replies to the probe request from the coupling destination switching target terminal 2. However, because the other APs 1 stop the probe response, they do not transmit the probe response. Accordingly, the coupling destination switching target terminal 2 does not recognize the presence of the APs 1 other than the AP 1 that is the next coupling destination, and the coupling destination switching target terminal 2 is guided in such a manner to perform coupling to the AP 1 that is the next coupling destination.

<Device Configuration>

Figure 5:
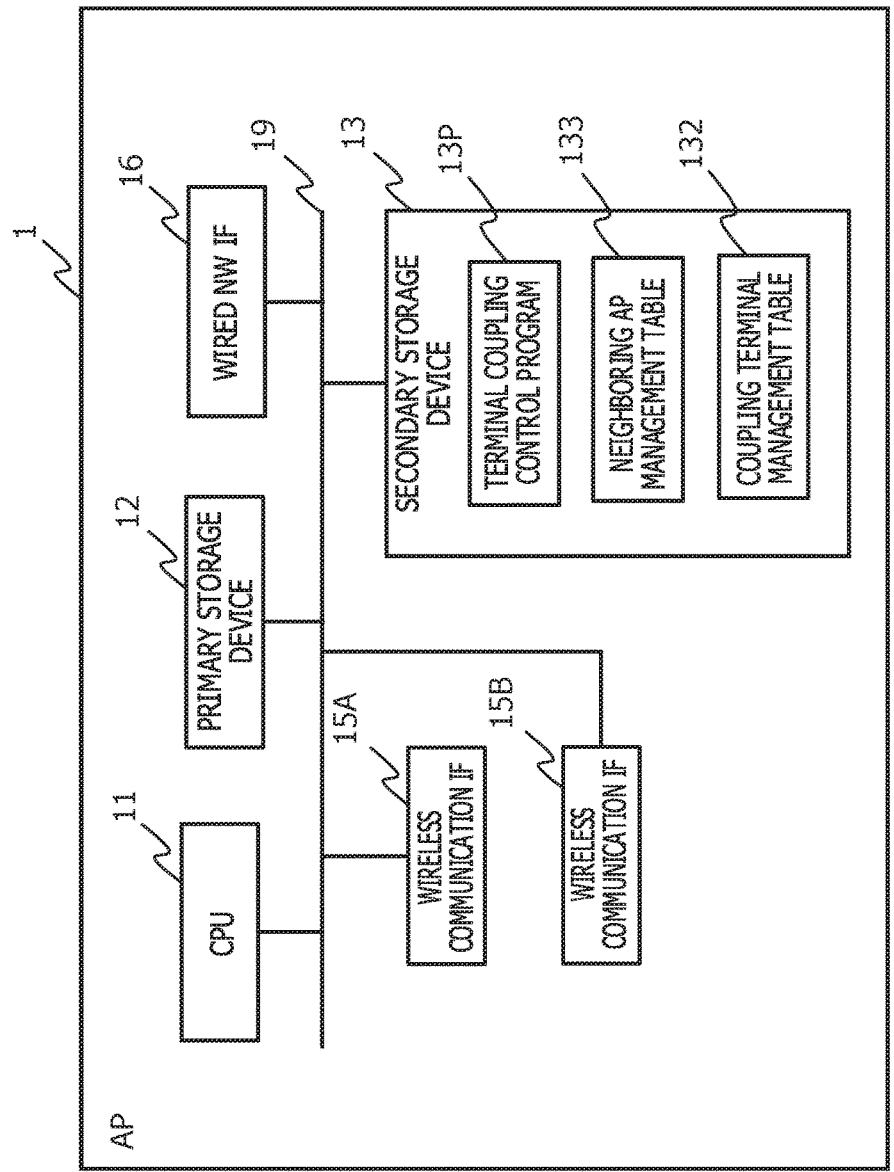
FIG. 5 is a diagram illustrating a hardware configuration of the AP.

FIG. 5 is a diagram illustrating an example of a hardware configuration of the AP 1. The AP 1 is an example of a "wireless base station". The AP 1 includes a central processing unit (CPU) 11, a primary storage device 12, a secondary storage device 13, wireless communication interfaces 15A and 15B, and a wired network interface 16, and these are electrically connected to one another with a bus 19.

The CPU 11 performs loading of an OS or various application programs that are retained in the secondary storage device 13 onto the primary storage device 12, and thus performs various processing operations. The CPU 11 is not limited to one CPU and multiple CPUs 11 may be included. The CPUs 11 are an example of a "control unit".

The primary storage device 12 is a volatile storage medium that provides the CPU 11 with a storage area or a working area onto which a program which is stored in the secondary storage device 13 is loaded and that is used as a buffer. The primary storage device 12 is, for example, a so-called random access memory (RAM), such as a dynamic RAM (DRAM), a static RAM (SRAM), or a synchronous DRAM (SDRAM).

Stored in the secondary storage device 13 are various programs, or pieces of data that the CPU 11 uses when executing each program. The secondary storage device 13 is, for example, a nonvolatile storage medium, such as an erasable programmable ROM (EPROM), or a hard disk drive. The secondary storage device 13 retains, for example, an operating system (OS), a terminal coupling control program 13P, and various application programs. The terminal coupling control program 13P is a program for performing the terminal coupling control processing described above. Furthermore, a coupling terminal management table 132 and a neighboring AP management table 133 are retained in the secondary storage device 13. The coupling terminal management table 132 and the neighboring AP management table 133 will be described in detail below.

According to the first embodiment, the wireless communication interfaces 15A and 15B are wireless communication circuits on the wireless LAN. The wireless communication interface 15A is an interface for communication with the terminal 2. The wireless communication interface 15B is an electromagnetic wave measurement interface for measuring the strength of an electromagnetic wave that is received on a utilization channel for a different AP 1. The wireless communication interface 15A is an example of a "first wireless communication unit". The wireless communication interface 15B is an example of a "second wireless communication unit".

The wired network interface 16 is, for example, a circuit that performs coupling to a wired network link cable such as a local area network (LAN) cable. The AP 1, for example, performs coupling to a different AP 1 through the wired network interface 16. The wired network interface 16 is an example of a "communication unit".

Moreover, a hardware configuration of the AP 1 that is illustrated in FIG. 5 is an example, and is not limited to what is described above. According to the embodiment, it is possible to suitably omit or replace the constituent element, or to suitably add a new constituent element. For example, the AP 1 may include a portable recording medium drive device, and may use a portable recording medium, such as an SD card, as the secondary storage device.

Figure 6:
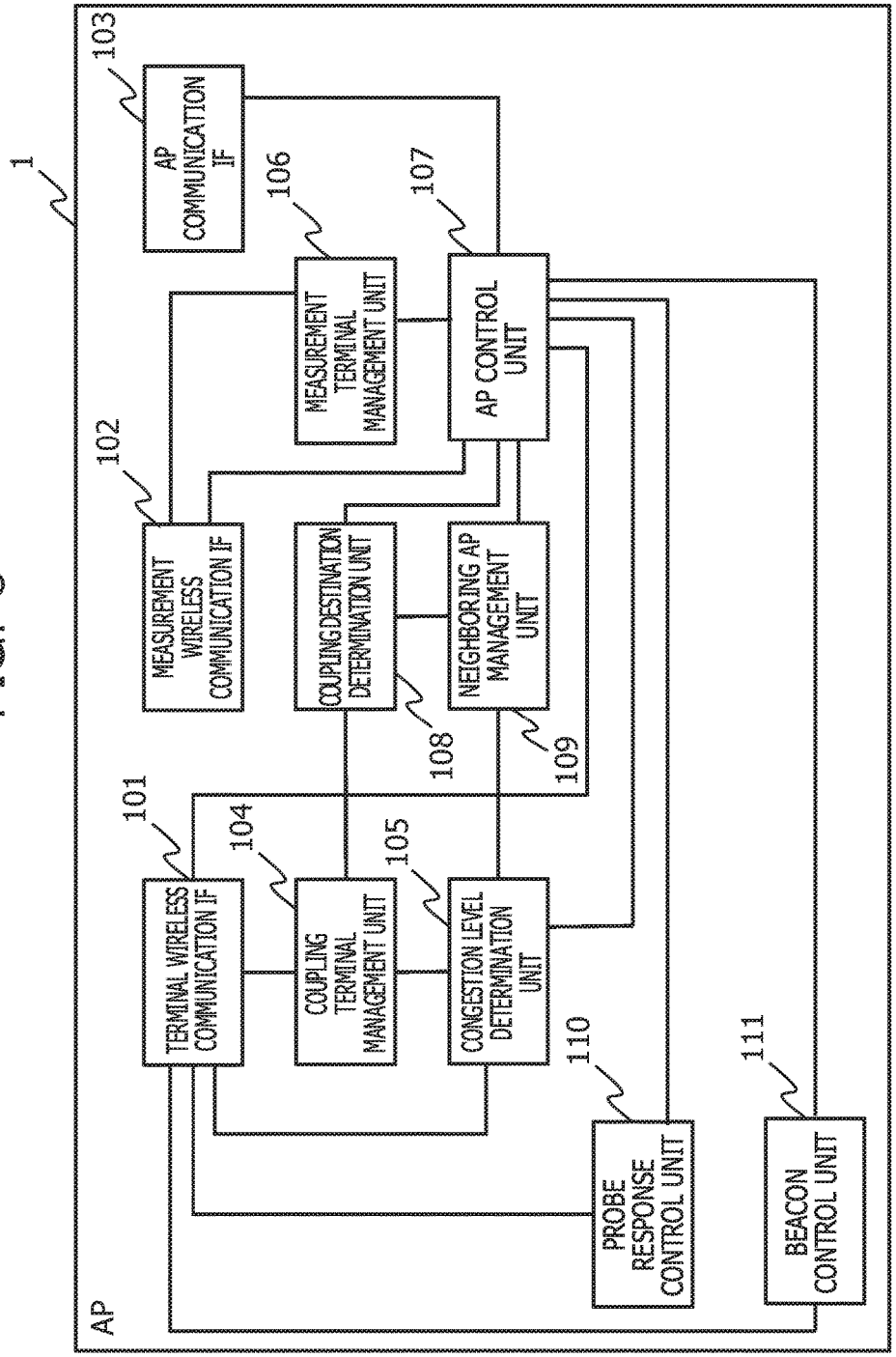
FIG. 6 is a diagram illustrating an example of functional constituents of the AP.

FIG. 6 is a diagram illustrating an example of functional constituents of the AP 1. As the functional constituents, the AP 1 includes a terminal wireless communication interface (IF) 101, a measurement wireless communication IF 102, and an AP communication IF 103, a coupling terminal management unit 104, a congestion level determination unit 105, a measurement terminal management unit 106, an AP control unit 107, a coupling destination determination unit 108, a neighboring AP management unit 109, a probe response control unit 110, and a beacon control unit 111. The coupling terminal management unit 104, the congestion level determination unit 105, the measurement terminal management unit 106, the AP control unit 107, the coupling destination determination unit 108, the neighboring AP management unit 109, the probe response control unit 110, and the beacon control unit 111 are functional constituents that are accomplished by the execution by the CPU 11 of the terminal coupling control program 13P within the secondary storage device 13. Moreover, these functional constituents may be accomplished by a piece of software that uses electric circuits such as a field-programmable gate array (FPGA).

The terminal wireless communication IF 101 is an interface for the communication with the terminal 2, and is equivalent to a wireless communication IF 15A. According to instructions from the probe response control unit 110 and the beacon control unit 111 that will be described below, the terminal wireless communication IF 101 changes the starting and the stopping of the probe response and of beacon transmission. Furthermore, the terminal wireless communication IF 101 measures an identifier and received electromagnetic wave strength of the terminal 2 that is performing coupling to the terminal wireless communication IF 101, and outputs a result of the measurement to the coupling terminal management unit 104. Furthermore, the terminal wireless communication IF 101 notifies the congestion level determination unit 105 of pieces of transfer quality information, such as a wireless occupancy rate, the number of coupling terminals, and the number of times that retransmission occurs, with a given period. The wireless occupancy rate is, for example, a rate of a communication time to a given unit time.

The coupling terminal management unit 104 manages the terminal 2 that is being connected to the terminal wireless communication IF 101. The details are as follows. For example, with a notification from the terminal wireless communication IF 101, the coupling terminal management unit 104 acquires the identifier of the terminal 2 that is being connected to the terminal wireless communication IF 101, and the received electromagnetic wave strength of the electromagnetic wave transmitted by each terminal 2. The coupling terminal management unit 104 stores information that is input from the terminal wireless communication IF 101, in the coupling terminal management table 132 that will be described below. Furthermore, the coupling terminal management unit 104, when requested, outputs the information that is retained in the coupling terminal management table 132, to the coupling destination determination unit 108 and the congestion level determination unit 105. The information (the identifier of the terminal 2 that is performing coupling and the received electromagnetic wave strength of the electromagnetic wave transmitted by each terminal 2) that is stored in the coupling terminal management table 132 is referred to as coupling terminal information.

The congestion level determination unit 105, for example, acquires the congestion level, based on the wireless occupancy rate that is input from the terminal wireless communication IF 101, the coupling terminal information that is input from the coupling terminal management unit 104, and the like. For the congestion level, for example, any one of the wireless occupancy rate, the number of coupling terminals, and the like, or a combination of these may be used. The congestion level is output to the AP control unit 107. The congestion level is output from the AP control unit 107 to the AP communication IF 103, and is transmitted by the AP communication IF 103 to a different AP 1 over the wired LAN 50. The congestion level is transmitted by any one of broadcasting, multicasting, or unicasting. The period with which the congestion level is calculated and transmitted is, for example, set by a manager on the minute basis.

Furthermore, in a case where the congestion level is the congestion threshold or above, the congestion level determination unit 105 determines that the utilization channel for the terminal wireless communication IF 101 is in congestion. The congestion threshold is a threshold for measuring the congestion in the utilization channel for the terminal wireless communication IF 101. For example, in a case where the congestion level is expressed in terms of the wireless occupancy rate, the congestion threshold is set to 80% or more, and in a case where the congestion level is expressed in terms of the number of coupling terminals, the congestion value is set to 30 or more. When determining that the utilization channel for the terminal wireless communication IF 101 is congested, the congestion level determination unit 105 notifies the AP control unit 107 of the congestion in the utilization channel for the terminal wireless communication IF 101.

The AP communication IF 103 is a wired interface for communicating with a different AP 1, and is equivalent to a wired network IF 16. The AP communication IF 103 performs coupling to the wired LAN 50. The AP communication IF 103 receives a notification of control information, such as the congestion level, from the AP control unit 107, and transmits the control information to a different AP 1. Furthermore, the AP control unit 107 outputs the control information from the different AP 1 to the AP control unit 107.

The neighboring AP management unit 109 manages the congestion level of the different AP 1 and the received electromagnetic wave strength of the electromagnetic wave transmitted by the different AP 1. The congestion level of a different AP 1 is input, with a given period, from the different AP 1 through the AP control unit 107 to the neighboring AP management unit 109. The received electromagnetic wave strength of the electromagnetic wave transmitted by the different AP 1 is acquired by measuring the beacon that is transmitted from the different AP 1. For the received electromagnetic wave strength of the electromagnetic wave transmitted by the different AP 1, any one of the terminal wireless communication IF 101 and the measurement wireless communication IF 102 may be used. A period with which the beacon transmitted by the different AP 1 is measured, for example, by the manager on the one-hour basis or on the one-day basis.

The neighboring AP management unit 109 stores the congestion level of the different AP 1 and the received electromagnetic wave strength of the electromagnetic wave transmitted by the different AP 1 in the neighboring AP management table 133 that will be described below. Furthermore, the neighboring AP management unit 109, when requested, outputs information that is stored in the neighboring AP management table 133, to the coupling destination determination unit 108. The information (the congestion level of the different AP 1 and the received electromagnetic wave strength of the electromagnetic wave transmitted by the different AP 1) that is stored in the neighboring AP management table 133 is hereinafter referred to as neighboring AP information.

The measurement wireless communication IF 102 is a measurement wireless interface for measuring the received electromagnetic wave strength on the utilization channel for the different AP 1, and is equivalent to a wireless communication IF 15B. In a case where an instruction that causes the received electromagnetic wave strength of the utilization channel to start to be measured is input from a different AP 1, according to an instruction from the AP control unit 107, the measurement wireless communication IF 102 performs adjustment to a frequency of the utilization channel for the different AP 1 and measures the received electromagnetic wave strength of the electromagnetic wave that is received on that channel. The measurement wireless communication IF 102 notifies the measurement terminal management unit 106 of the detected terminal 2 and the received electromagnetic wave strength of each terminal 2, as a result of the measurement. The result of the measurement by the measurement wireless communication IF 102 is hereinafter referred to as measurement terminal information. Included in the measurement terminal information are an identifier of the detected terminal 2 and received electromagnetic wave strength of each detected terminal 2.

The measurement terminal management unit 106 manages the measurement terminal information that is input from the measurement wireless communication IF 102. The information that is managed by the measurement terminal management unit 106 includes the identifier of the terminal 2 that is detected, with the measurement of the electromagnetic wave strength, by the measurement wireless communication IF 102, and the received electromagnetic wave strength of each terminal 2. The measurement terminal management unit 106 outputs the measurement terminal information to the AP control unit 107. The measurement terminal information is output from the AP control unit 107 to the AP communication IF 103, and is output to the AP 1 that is a transmission source of the instruction that causes the received electromagnetic wave strength on a designated channel to start to be measured.

In a case where the congestion is detected by the congestion level determination unit 105, the coupling destination determination unit 108 receives the instruction from the AP control unit 107, and determines the coupling destination switching target terminal 2, among the terminals 2 that are performing coupling to the host AP 1, and the AP 1 that is the next coupling destination of that terminal 2. This determination is performed based on the neighboring AP information that is input from the neighboring AP management unit 109, and the measurement terminal information from the different AP 1, which is input from the AP control unit 107.

For example, the coupling destination determination unit 108 selects the AP 1 that has the lowest congestion level in the neighboring AP information, as the next coupling destination. Furthermore, the terminal 2 that indicates the greatest received electromagnetic wave strength in the measurement terminal information of the AP 1 that is selected as the next coupling destination is selected as the coupling destination switching target terminal. Moreover, the coupling destination switching target terminal and the method of selecting the next coupling destination of that terminal is not limited to the method described above. The coupling destination determination unit 108 outputs the switch terminal information including an identifier of the coupling destination switching target terminal and an identifier of the AP 1 that is the next coupling destination of that terminal, to the AP control unit 107. The switch terminal information is output from the AP control unit 107 to the AP communication IF 103, and is transmitted from the AP communication IF 103 to a different AP 1. The switch terminal information may be transmitted by any one of broadcasting, multicasting, and unicasting.

The probe response control unit 110 receives the instruction from the AP control unit 107 and controls the starting and the stopping of the probe response by the terminal wireless communication IF 101. For example, in a case where the congestion level determination unit 105 determines the congestion in the utilization channel for the terminal wireless communication IF 101, the probe response control unit 110 receives the instruction from the AP control unit 107, and stops the probe response by the terminal wireless communication IF 101. Furthermore, in a case where the identifier of the host AP 1 is included in the switch terminal information from a different AP 1, the probe response control unit 110 temporarily sets the terminal wireless communication IF 101 in such a manner that the probe response is temporarily stopped and that the reply to the probe request from the terminal 2 that has the identifier which is included in that switch terminal information is made.

The beacon control unit 111 receives the instruction from the AP control unit 107 and controls the starting and the stopping of the beacon transmission by the terminal wireless communication IF 101. For example, in a case where the congestion level determination unit 105 determines the congestion in the utilization channel for the terminal wireless communication IF 101, the beacon control unit 111 receives the instruction from the AP control unit 107 and stops the beacon transmission by the terminal wireless communication IF 101.

The AP control unit 107 controls each functional constituent based on the control information that is input from each functional constituent. For example, the AP control unit 107 controls the starting or the stopping of the probe response and the beacon transmission by each of the probe response control unit 110 and the beacon control unit 111. For example, the AP control unit 107 instructs the measurement terminal management unit 106 to adjust the measurement wireless communication IF 102 to the utilization channel for a different AP 1, and to measure the received electromagnetic wave strength. For example, the AP control unit 107 instructs the coupling destination determination unit 108 to select the coupling destination switching target terminal and the next coupling destination of that terminal based on the detection of the congestion in the utilization channel for the terminal wireless communication IF 101.

Furthermore, for example, the AP control unit 107 outputs the pieces of control information, such as the congestion level that is input from the congestion level determination unit 105, the measurement terminal information that is input from the measurement terminal management unit 106, and the switch terminal information that is input from the coupling destination determination unit 108, to the AP communication IF 103, and transmits the pieces of control information to a different AP 1. Furthermore, for example, the AP control unit 107 receives input of the pieces of control information from a different AP 1, such as the measurement terminal information and the congestion level, from the AP communication IF 103, and outputs the pieces of control information to the coupling destination determination unit 108 and the neighboring AP management unit 109.

Furthermore, the AP control unit 107 gives an instruction to a different AP 1. For example, in a case where the congestion in the utilization channel for the terminal wireless communication IF 101 is detected, a measurement starting instruction that causes the received electromagnetic wave strength on that utilization channel to start to be measured is transmitted to a different AP 1 through the AP communication IF 103. Processing by the AP control unit 107 will be described in more detail below.

FIG. 7 is a diagram illustrating an example of the coupling terminal management table 132. Information on the terminal that is performing coupling to the terminal wireless communication IF 101 is stored in the coupling terminal management table 132. The coupling terminal management table 132 is managed by the coupling terminal management unit 104.

For entry, the heading of terminal identifier and the heading of received electromagnetic wave strength are included in the coupling terminal management table 132. A MAC address that is allocated to a wireless LAN interface of the terminal 2 which is performing coupling to the terminal wireless communication IF 101 is stored under the heading of terminal identifier in the coupling terminal management table 132 that is illustrated in FIG. 7. The received electromagnetic wave strength of the terminal 2, which is measured by the terminal wireless communication IF 101, is stored under the heading of received electromagnetic wave strength. Because the terminal wireless communication IF 101 measures the received electromagnetic wave strength with a given period, the heading of the received electromagnetic wave strength in the coupling terminal management table 132 is updated with that given period.

Because the received electromagnetic wave strength of the terminal 2 that is performing coupling to the terminal wireless communication IF 101 is stored in the coupling terminal management table 132, the number of terminals that are being connected the terminal wireless communication IF 101 is acquired based on the number of entries in the coupling terminal management table 132.

Furthermore, the measurement terminal information of the measurement wireless communication IF 102 has the same configuration as the coupling terminal management table 132 as well. However, the measurement terminal information is associated with the identifier of the AP 1 that is a notification source. That is, when the AP 1 transmits an instruction that causes the utilization channel to start to be measured with the measurement wireless communication IF 102, as many pieces of measurement terminal information as the number of APs 1 that are the notification sources are notified.

FIG. 8 is a diagram illustrating an example of the neighboring AP management table 133. Information on the AP 1 that is positioned in the vicinity is stored in the neighboring AP management table 133. The neighboring AP management table 133 is managed by the neighboring AP management unit 109.

For entry, the heading of AP identifier, the heading of congestion level, and the heading of received electromagnetic wave strength are included in the neighboring AP management table 133 that is illustrated in FIG. 8. A MAC address that is allocated to the wired network IF 16 of each AP 1 which is present within the wireless communication network system 100 is stored in the heading of AP identifier. The MAC address that is allocated to the wired network IF 16 of each AP 1 that is present within the wireless communication network system 100 is managed in advance by the manager.

A congestion level of each AP 1 that is notified from each AP 1 is stored under the heading of congestion level. Because the congestion level is notified with a given period, a value under the heading of congestion level is updated whenever the congestion level is notified.

A measurement value of the received electromagnetic wave strength of the beacon from each AP 1 is stored under the received electromagnetic wave strength. Although the AP 1 is positioned within the wireless communication network system 100, the received electromagnetic wave strength of the AP 1 that is positioned so far away that the electromagnetic wave does not reach that AP 1 is blank because the beacon does not reach that AP 1. Moreover, a MAC Address that is allocated to the terminal wireless communication IF 101 of the AP 1 is stored in the beacon. The neighboring AP management unit 109, in advance, retains a table (not illustrated) for correspondence between the MAC Address of the terminal wireless communication IF 101 a MAC address of the AP communication IF 103, and the MAC address of the AP communication IF 103 of the AP 1 that is a transmission source of the beacon is acquired from the table for correspondence.

A relationship in distance between the host AP 1 and each AP 1 is known by the received electromagnetic wave strength of each AP 1 that is stored in the neighboring AP management table 133. Moreover, for entry, the heading for the host AP 1 is also included in the neighboring AP management table 133.

Based on as many pieces of terminal information as the number of the APs 1 that are the notification sources, the coupling terminal management table 132, and the neighboring AP management table 133, the coupling destination determination unit 108 selects the coupling destination switching target terminal and the coupling destination of that terminal. For example, in a case where the AP 1 that has the lowest congestion level is selected as the next coupling destination, the coupling destination determination unit 108 selects the AP 1 that is the next coupling destination, referring to the neighboring AP management table 133.

Furthermore, in a case where a terminal that indicates the greatest received electromagnetic wave strength in the AP 1 which is selected as the next coupling destination is selected as the coupling destination switching target terminal, the coupling destination determination unit 108 refers to the measurement terminal information of the AP 1 that is selected as the next coupling destination, and the coupling terminal management table 132. The coupling destination determination unit 108 selects a terminal that has the greatest received electromagnetic wave strength among the terminals 2 of which the received electromagnetic wave strengths are registered in both the measurement terminal information of the AP 1 that is selected as the next coupling destination and the coupling terminal management table 132, as a terminal that releases the coupling.

<Flow of Processing>

Figure 9:
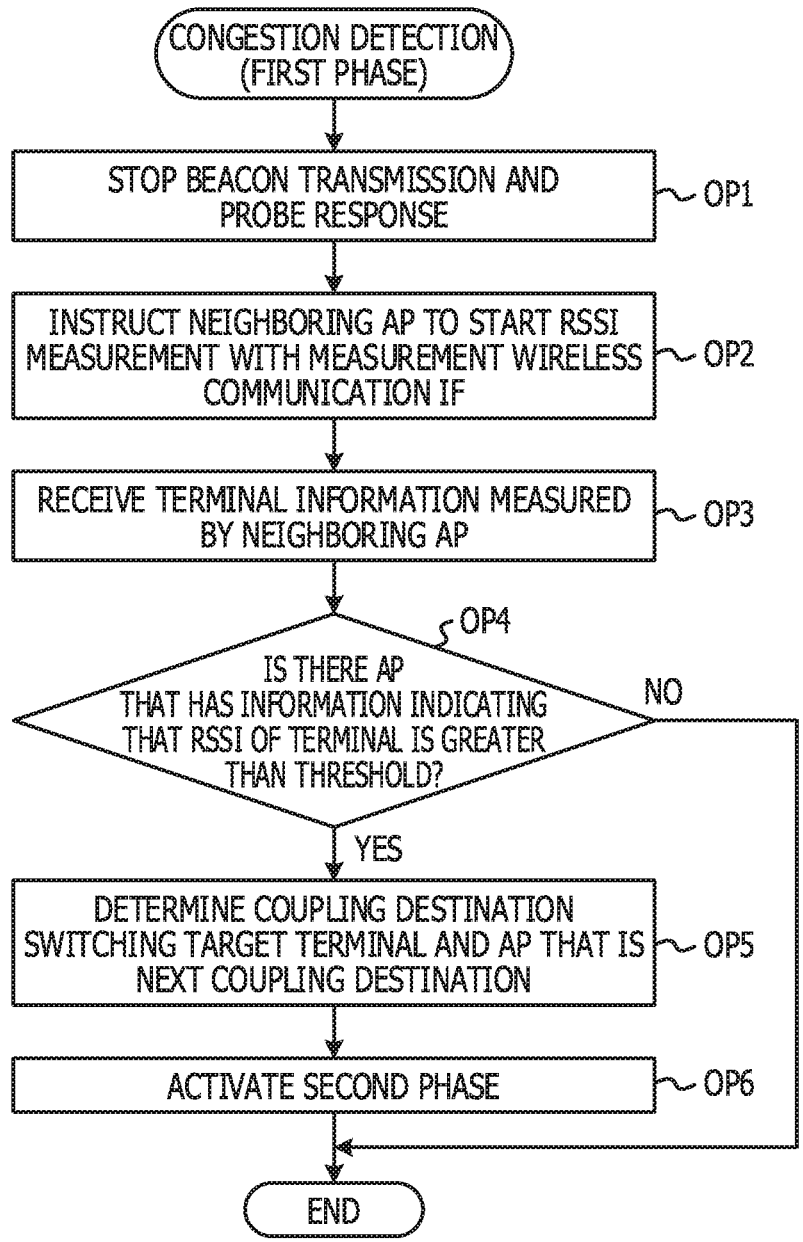
FIG. 9 is a flowchart illustrating an example of processing by an AP control unit in the first-phase processing of the terminal coupling control processing.

FIG. 9 is a flowchart illustrating an example of processing by the AP control unit 107 in the first-phase processing of the terminal coupling control processing. Processing that is illustrated in FIG. 9 starts when the congestion level determination unit 105 notifies the AP control unit 107 of the detection of the congestion in the utilization channel for the terminal wireless communication IF 101. Moreover, for convenience, the description is provided with the AP control unit 107 as a main subject, but a main subject for the processing that is illustrated in FIG. 9 is in practice the CPU 11 that executes the terminal coupling control program 13P. The same is true for the following flowchart.

In OP1, the AP control unit 107 instructs each of the beacon control unit 111 and the probe response control unit 110 to stop the beacon transmission and the transmission of the probe response. Accordingly, a coupling from a new terminal is not made. Moreover, in a case where the beacon transmission and the transmission of the probe response are already in a stopped state, OP1 in the processing is omitted. Next, the processing proceeds to OP2.

In OP2, the AP control unit 107 transmits an instruction that causes the received electromagnetic wave strength on the utilization channel to start to be measured with the measurement wireless communication IF 102, to the AP 1 that is positioned in the vicinity, through the AP communication IF 103. Next, the processing proceeds to OP3.

In OP3, the AP control unit 107 receives the measurement terminal information that is a response from the neighboring AP 1 to the instruction that causes the received electromagnetic wave strength on the utilization channel to start to be measured with the measurement wireless communication IF 102. For example, when the pieces of measurement terminal information from all the APs 1, of which the received electromagnetic wave strengths are recorded in the neighboring AP management table 133 are received, next, the processing proceeds to OP4. For example, after a given time elapses after the instruction that causes the received electromagnetic wave strength to start to be measured is transmitted, the processing may proceed to OP4.

In OP4, the AP control unit 107 determines whether or not the neighboring AP 1 that has the measurement terminal information indicating that at least one terminal 2 has received an electromagnetic wave strength higher than the threshold is present. The threshold that is used for this determination is one for determining whether or not the coupling destination switching target terminal is able to perform communication through the neighboring AP 1 after coupling switching, and is set to a value of the received electromagnetic wave strength that sufficiently guarantees communication quality on the wireless LAN.

In a case where the AP 1 that has the measurement terminal information indicating that the received electromagnetic wave strength of at least one terminal 2 is higher than the threshold is present (Yes in OP4), the processing proceeds to OP5. In a case where the AP 1 that has the measurement terminal information indicating that the received electromagnetic wave strength of at least one terminal 2 is higher than the threshold is not present (No in OP4), because the AP 1 that is suitable for the next coupling destination is not present in the vicinity, the processing that is illustrated in FIG. 9 ends without performing coupling destination switching of the terminal 2.

In OP5, the AP control unit 107 instructs the coupling destination determination unit 108 to determine the coupling destination switching target terminal 2 and the AP 1 that is the next coupling destination, and acquires pieces of information on the coupling destination switching target terminal 2 and on the AP 1 that is the next coupling destination, from the coupling destination determination unit 108. A method for the coupling destination determination unit 108 to determine the coupling destination switching target terminal 2 and the AP 1 that is the next coupling destination is as described above. Specifically, the AP 1 that has the lowest congestion level is selected as the next coupling destination, and in the selected AP 1, the terminal 2 that has the greatest received electromagnetic wave strength is selected as the terminal 2. Moreover, multiple terminals 2 may be selected as the coupling destination switching targets. How many of the terminal coupling destinations are switched is determined depending on the congestion level. For example, in a case where the congestion level is the number of coupling terminals and the congestion is detected with the number of coupling terminals being 30 or more, the number of the coupling destination switching target terminals is determined in such a manner that the number of coupling terminals is less than 30. Next, the processing proceeds to OP6.

In OP6, the AP control unit 107 activates the second-phase processing of the terminal coupling control processing. Thereafter, the processing that is illustrated in FIG. 9 ends.

Figure 10:
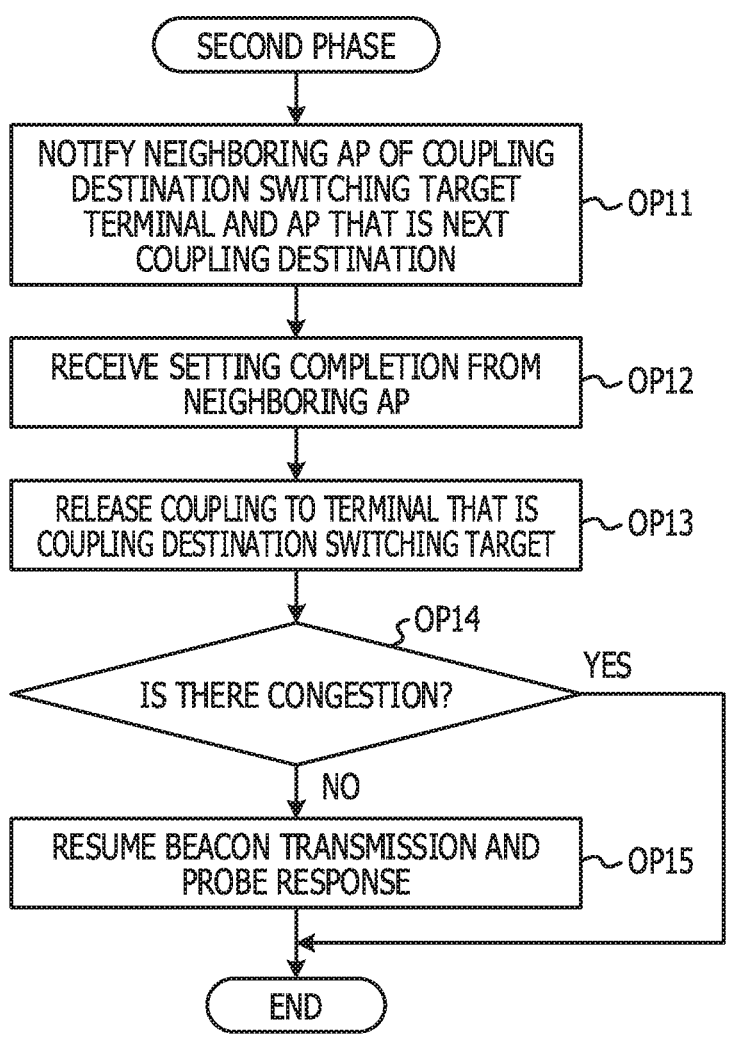
FIG. 10 is a flowchart illustrating an example of the processing by the AP control unit in the second-phase processing of the terminal coupling control processing.

FIG. 10 is a flowchart illustrating an example of the processing by the AP control unit 107 in the second-phase processing of the terminal coupling control processing. Processing that is illustrated in FIG. 10 starts after the coupling destination switching target terminal 2 and the AP 1 that is the next coupling destination are selected in the first phase of the terminal coupling control processing.

In OP11, the AP control unit 107 notifies the neighboring AP 1 of switch terminal information including an identifier of the coupling destination switching target terminal 2 and an identifier of the AP 1 that is the next coupling destination, through the AP communication IF 103. Next, the processing proceeds to OP12.

In OP12, the AP control unit 107 receives a notification of setting completion from the neighboring AP 1 through the AP communication IF 103. For example, when the notification of the setting completion is received from the APs 1 of which the received electromagnetic wave strengths are recorded in the neighboring AP management table 133, next, the processing proceeds to OP13. For example, a given time has elapsed after the switch terminal information is transmitted, the processing may proceed to OP13.

In OP13, the AP control unit 107 releases a coupling to the coupling destination switching target terminal 2. Next, the processing proceeds to OP14.

In OP14, the AP control unit 107 determines whether or not the utilization channel for the terminal wireless communication IF 101 of the host AP 1 is in congestion. The AP control unit 107 requests the congestion level determination unit 105 to determine whether or not the utilization channel for the terminal wireless communication IF 101 is in congestion. By a current congestion level being a given threshold or above, the congestion level determination unit 105 detects that the utilization channel for the terminal wireless communication IF 101 of the device is in congestion.

In a case where the utilization channel for the terminal wireless communication IF 101 of the host AP 1 (Yes in OP14) is in congestion, the processing that is illustrated in FIG. 10 ends. Thereafter, when the next timing for calculation of the congestion level of the congestion level determination unit 105 comes, the congestion in the utilization channel for the terminal wireless communication IF 101 is again detected, and the first phase of the terminal coupling control processing in FIG. 9 starts. A new coupling destination switching target terminal 2 is selected.

In a case where the utilization channel for the terminal wireless communication IF 101 of the host AP 1 is not congested (No in OP14), the processing proceeds to OP15.

In OP15, because the congestion in the utilization channel for the terminal wireless communication IF 101 is alleviated, the AP control unit 107 instructs the beacon control unit 111 and the probe response control unit 110 to start the beacon transmission and the transmission of the probe response, respectively, with the terminal wireless communication IF 101. Accordingly, a coupling by a new terminal to the host AP 1 is resumed. Thereafter, the processing that is illustrated in FIG. 10 ends.

Figure 11A:
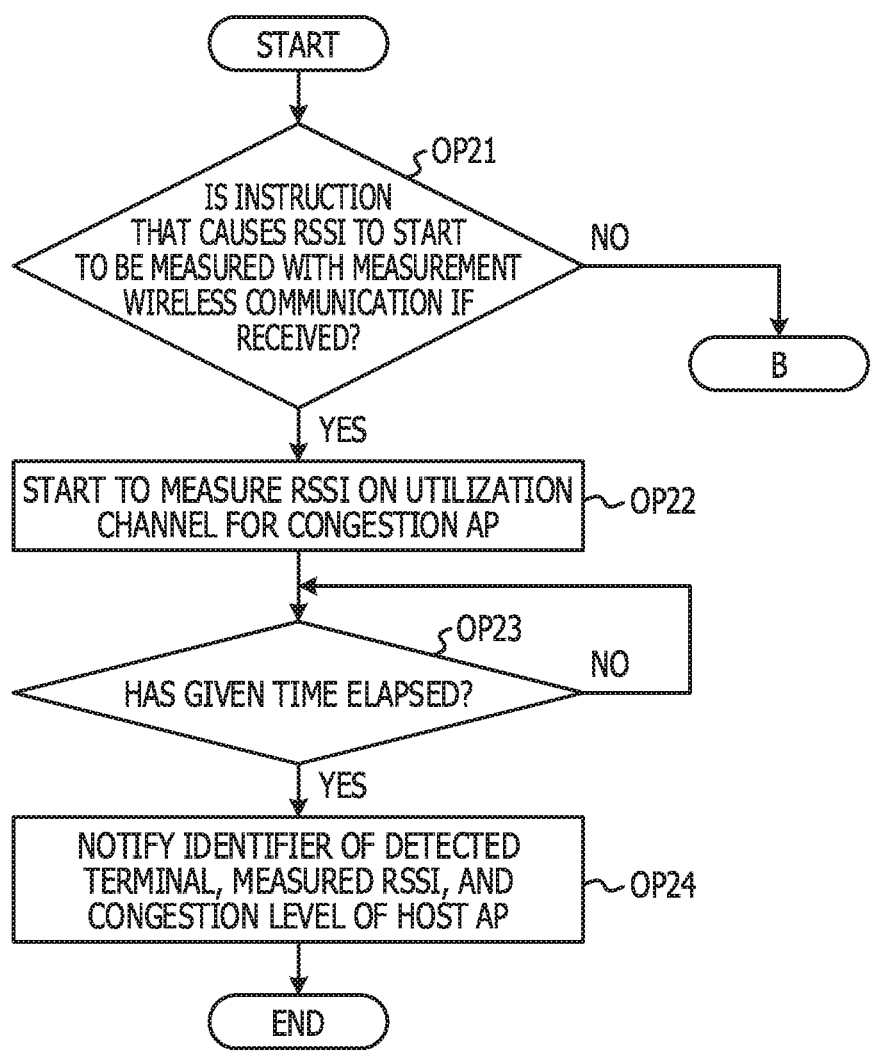
FIG. 11A is a flowchart illustrating an example of the processing that is performed by the AP control unit when a terminal wireless communication IF of the host AP does not detect congestion.
Figure 11B:
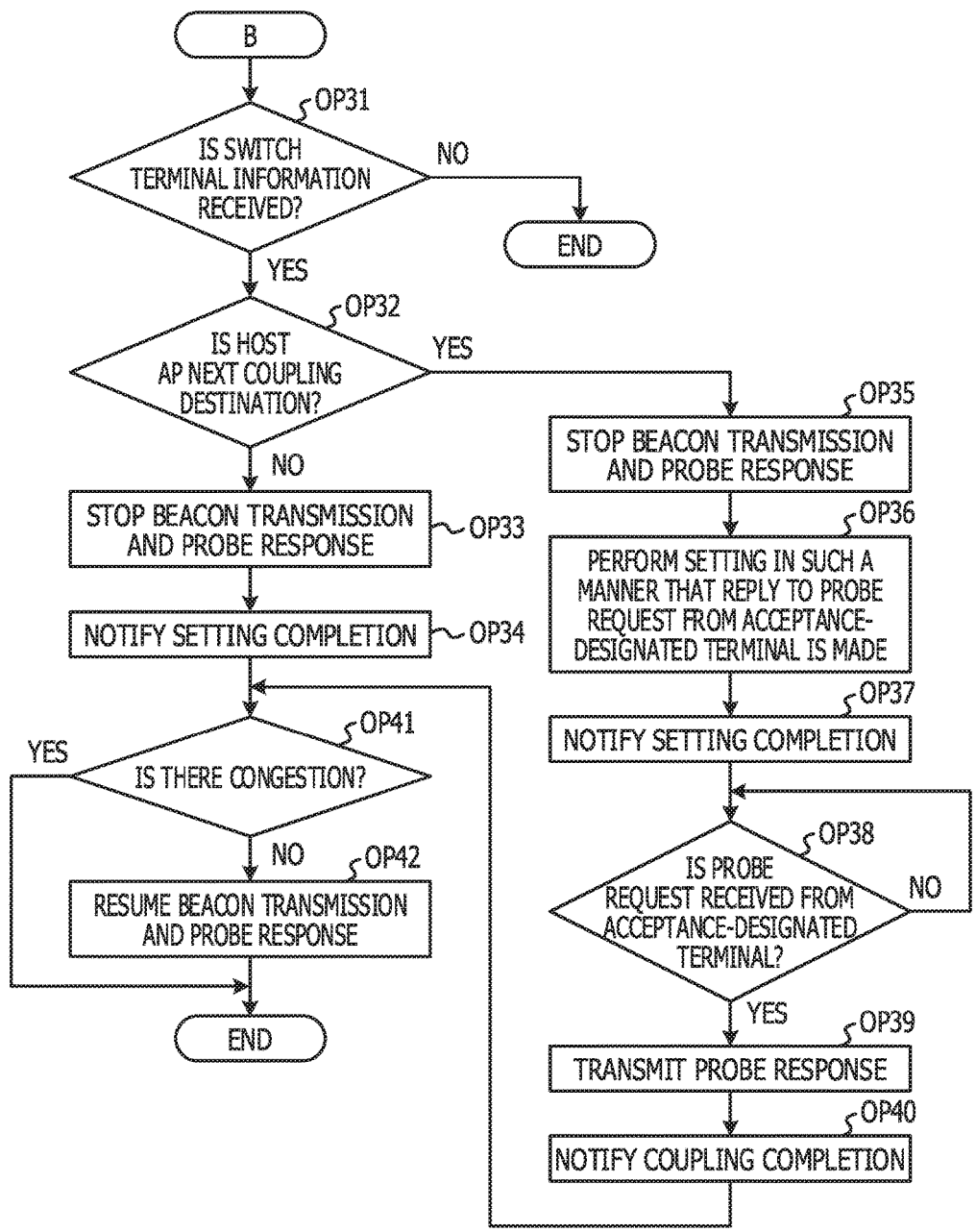
FIG. 11B is a flowchart of an example of the processing that is performed by the AP control unit when the terminal wireless communication IF of the host AP does not detect the congestion.

FIGS. 11A and 11B are flowcharts, each of which illustrates an example of the processing that is performed by the AP control unit 107 when the terminal wireless communication IF 101 of the host AP 1 does not detect the congestion. Processing that is illustrated in each of FIGS. 11A and 11B starts together with the activation of the AP 1, and is repeatedly performed when the AP 1 is in operation. The processing of each of FIGS. 11A and 11B is also processing that is performed by the CPU 11 executing a terminal coupling control program 13P. That is, the terminal coupling control program 13P is a program that, after the AP 1 is activated, automatically starts to be executed.

In OP21, in a case where the AP control unit 107 receives an instruction that causes the received electromagnetic wave strength on the utilization channel, of the in-congestion AP 1 to start to be measured, from that in-congestion AP 1 through the AP communication IF 103 (Yes in OP21), the processing proceeds to OP22. In a case where the measurement starting instruction is not received (No in OP21), the processing proceeds to OP31.

OP22 to OP24 are processing operations that are performed in a case where the instruction that causes the received electromagnetic wave strength on the utilization, of the in-congestion AP 1 is received from that in-congestion AP 1. In OP22, the AP control unit 107 instructs the measurement wireless communication IF 102 to measure the received electromagnetic wave strength on the utilization channel, of the in-congestion AP 1. The measurement wireless communication IF 102 starts to measure the received electromagnetic wave strength, in a state of being adjusted to the utilization channel for the in-congestion AP 1. Next, the processing proceeds to OP23.

In OP23, the AP control unit 107 is in a waiting state for a given time for which the measurement wireless communication IF 102 performs measurement. When the given time elapses (Yes in OP23), a result of (measurement terminal information on) the measurement by the measurement wireless communication IF 102 of the received electromagnetic wave strength on the utilization channel, of the in-congestion AP 1 is input into the AP control unit 107 through the measurement terminal management unit 106. Next, the processing proceeds to OP24.

IN OP24, the AP control unit 107 transmits the measurement terminal information including the identifier of the terminal 2 that is detected by the measurement of the received electromagnetic wave strength on the utilization channel, of the in-congestion AP 1, and the measured received electromagnetic wave strength, and the congestion level of the host AP 1, to the in-congestion AP 1 through the AP communication IF 103. Thereafter, the processing that is illustrated in FIG. 11A ends and the processing again starts from OP21.

In OP31 in FIG. 11B, in a case where the AP control unit 107 receives the switch terminal information from the in-congestion AP 1 through the AP communication IF 103 (Yes in OP31), the processing proceeds to OP32. In a case where neither the switch terminal information nor the instruction that causes the received electromagnetic wave strength on the utilization channel, of the in-congestion AP 1 to start is received (No in OP31), the processing that is illustrated in FIG. 11B ends, and the processing again starts from OP21 in FIG. 11A.

The processing operations in OP32 to OP42 are ones that are performed in a case where the switch terminal information is received from the in-congestion AP 1. Included in the switch terminal information are the identifier of the coupling destination switching target terminal 2 and the identifier of the AP 1 that is the next coupling destination.

In OP32, the AP control unit 107 determines whether or not the identifier of the host AP 1 is included, as the next coupling destination, in the switch terminal information. In a case where the identifier of the host AP 1 is included, as the next coupling destination (Yes in OP32), in the switch terminal information, the processing proceeds to OP35. In a case where the identifier of the host AP 1 is not included in the switch terminal information (No in OP32), the processing proceeds to OP33.

OP33 to OP34 are processing operations that are performed in the case where the identifier of the host AP 1 is not included in the switch terminal information, that is, in a case where no terminal performs coupling to the host AP 1. In OP33, the AP control unit 107 instructs the beacon control unit 111 and the probe response control unit 110 to stop the beacon transmission and the transmission of the probe response, respectively, with the terminal wireless communication IF 101. Accordingly, with the switch terminal information, new terminals 2 including a terminal 2 that is designated as the coupling destination switching target terminal are suppressed from newly performing coupling. Next, the processing proceeds to OP34.

In OP34, the AP control unit 107 transmits a setting completion notification that setting is completed according to the switch terminal information, to the in-congestion AP 1 through the AP communication IF 103. Next, the processing proceeds to OP41.

OP35 to OP40 are processing operations that are performed in a case where the identifier of the host AP 1 is included, as the next coupling destination, in the switch terminal information. In OP35, the AP control unit 107 instructs the beacon control unit 111 and the probe response control unit 110 to stop the beacon transmission and the transmission of the probe response, respectively, with the terminal wireless communication IF 101. Accordingly, a coupling by a new terminal 2 is suppressed. Next, the processing proceeds to OP36.

In OP36, the AP control unit 107 instructs the probe response control unit 110 to reply to the probe request from the terminal in which, with the switch terminal information, the host AP 1 is designated as the next coupling destination. The terminal in which, with the switch terminal information, the host AP 1 is the next coupling destination is hereinafter referred to as an acceptance-designated terminal. The probe response control unit 110 performs the setting in such a manner that the reply to the probe request from the acceptance-designated terminal is made in the terminal wireless communication IF 101. Next, the processing proceeds to OP37.

In OP37, the AP control unit 107 transmits the setting completion notification to the in-congestion AP 1 through the AP communication IF 103. Next, the processing proceeds to OP38.

In OP38, the AP control unit 107 is in a state of waiting to receive the probe request from the acceptance-designated terminal. In a case where the probe request is received in the terminal wireless communication IF 101 from the acceptance-designated terminal (Yes in OP38), the processing proceeds to OP39.

In OP39, in the terminal wireless communication IF 101, the probe response control unit 110 transmits the probe response to the probe request from the acceptance-designated terminal and notifies the AP control unit 107 of the completion of the probe response to the acceptance-designated terminal. Thereafter, the coupling processing is performed between the terminal wireless communication IF 101 and the acceptance-designated terminal. Next, the processing proceeds to OP40.

In OP40, the AP control unit 107 transmits a coupling completion response for notifying that the coupling to the acceptance-designated terminal is completed, to the in-congestion AP 1. Next, the processing proceeds to OP41.

In OP41, the AP control unit 107 determines whether or not the utilization channel for the terminal wireless communication IF 101 of the host AP 1 is in congestion. In the case where the utilization channel for the terminal wireless communication IF 101 of the host AP 1 is in congestion (Yes in OP41), the processing that is illustrated in FIG. 11B ends and instead the terminal coupling control processing that is illustrated in FIG. 9 starts. In the case where the utilization channel for the terminal wireless communication IF 101 of the host AP 1 is not congested (No in OP41), the processing proceeds to OP42.

In OP42, the AP control unit 107 instructs the beacon control unit 111 and the probe response control unit 110 to start the beacon transmission and the transmission of the probe response, respectively, with the terminal wireless communication IF 101. This is because the utilization channel for the terminal wireless communication IF 101 is not congested and it is possible to accept a coupling by a new terminal 2. Accordingly, the coupling by the new terminal 2 to the host AP 1 is resumed. Thereafter the processing that is illustrated in FIG. 11B ends and the processing starts again from OP21 in FIG. 11A.

Operational Example

FIG. 12 is a diagram illustrating an example of a sequence of terminal coupling control processing by the wireless communication network system 100 that is illustrated in FIG. 1. In an example that is illustrated in FIG. 12, output strengths of electromagnetic waves of the AP #1, the AP #2, and the AP #3 are assumed to be same. Furthermore, it is assumed that the terminal #1 is positioned the closest to the AP #1, the AP #2 is positioned the second closest to the terminal #1, and the AP #3 is positioned the third closest to the terminal #1. In the example that is illustrated in FIG. 12, the terminal #1 performs coupling to the AP #1 and performs communication.

In S1, the AP #1 detects the congestion in the utilization channel for the terminal wireless communication IF 101. In S2, the AP #1 stops the beacon transmission and the transmission of the probe response from the terminal wireless communication IF 101 (OP1 in FIG. 9).

In S3, the AP #1 transmits the instruction that causes the received electromagnetic wave strength on the utilization channel, of the AP #1 to start to be measured (OP2 in FIG. 9). The instruction that causes the received electromagnetic wave strength on the utilization channel, of the AP #1 to start to be measured may be transmitted by broadcasting, multicasting, and unicasting.

In S4, each of the AP #2 and the AP #3 receives the instruction that causes the received electromagnetic wave strength on the utilization channel, of the AP #1 to start to be measured, from the AP #1 (Yes in OP21 in FIG. 11A) and performs the measurement of the received electromagnetic wave strength with the measurement wireless communication IF 102 being adjusted to the utilization channel for the AP #1 (OP22 and OP23 in FIG. 11A). Because any of the AP #2 and the AP #3 is positioned within a range where the electromagnetic wave transmitted by the terminal #1 propagates, the AP #2 and the AP #3 are able to measure the strength of the electromagnetic wave received from the terminal #1.

In S5 and S6, each of the AP #2 and the AP #3 transmits the measurement terminal information and the congestion level to the AP #1 (OP24 in FIG. 11A). In the example that is illustrated in FIG. 12, the identifier of the AP #1 and the received electromagnetic wave strength of the electromagnetic wave from the terminal #1 are included in any one of the measurement terminal information of the AP #2 and the measurement terminal information of the AP #3. Moreover, the measurement terminal information is transmitted by unicasting with the AP #1 as the destination.

In S7, the AP #1 receives the measurement terminal information from each of the AP #2 and the AP #3 (OP3 in FIG. 9), and determines the coupling destination switching target terminal and the next coupling destination (OP5 in FIG. 9). Moreover, any one of the received electromagnetic wave strengths of the terminal #1 that are included in the measurement terminal information of the AP #2 and the measurement terminal information of the AP #3 is assumed to be a value that is greater than the threshold and at which communication is possible (Yes in OP4 in FIG. 9). The AP #1 is assumed to select the terminal #1 as the coupling destination switching target terminal and the AP #2 as the next coupling destination.

In S8, the AP #1 transmits the switch terminal information (OP11 in FIG. 10). The identifier of the terminal #1 and the identifier of the AP #2 are included, in a state of being associated with each other, in the switch terminal information that is transmitted from the AP #1 in S8. The switch terminal information may be transmitted by any one of broadcasting, multicasting, and unicasting.

In S9, each of the AP #2 and the AP #3 receives the switch terminal information (Yes in OP31 in FIG. 11B) and stops the beacon transmission and the transmission of the probe response with the terminal wireless communication IF 101 (OP33 and OP35 in FIG. 11B).

In S10, because with the switch terminal information, the AP #2 is designated as the next coupling destination, the setting is performed in such a manner that the probe response to the probe request from the terminal #1 is transmitted (OP36 in FIG. 11B) and the setting completion notification is transmitted to the AP #1 (OP37 in FIG. 11B).

In S11, because an identifier of the AP #3 itself is not included in the switch terminal information, when the processing ends in S9, without any change, the AP #3 transmits the setting completion notification to the AP #1 (OP34 in FIG. 11B). Moreover, the setting completion notification is transmitted by unicasting with the AP #1 as the destination.

In S12, the AP #1 receives the setting completion notification from each of the AP #2 and the AP #3 (OP12 in FIG. 10) and releases a coupling to the terminal #1 (OP13 in FIG. 10).

In S13, because the coupling is released by the AP #1, the terminal #1 starts recoupling processing in order to perform handover. In S14, as one of the retransmission processing operations, the terminal #1 transmits the probe request on the utilization channel for the terminal wireless communication IF 101 of each of the AP #1, the AP #2, and the AP #3.

In S15, the AP #2 receives the probe request from the terminal #1 (OP38 in FIG. 11B), and transmits the probe response to the terminal #1 (OP39 in FIG. 11B). Although the AP #1 and the AP #3 receives the probe request from the terminal #1, because the transmission of the probe response is stopped, the probe response is not transmitted to the terminal #1.

In S16, the terminal #1 receives the probe response from the AP #2. Because the probe response is not transmitted from the AP #1 and the AP #3 to the terminal #1, the terminal #1 recognizes the presence of the AP #2, but does not recognize the presence of the AP #1 and the AP #3. In S17, the terminal #1 performs coupling to the AP #2 of which the presence is recognized.

In S18, the AP #2 transmits the coupling completion notification to the AP #1 (OP40 in FIG. 11B). It is assumed that the terminal #1 performs a handover from the AP #1 to the AP #2 and thus that the congestion in the AP #1 is alleviated. Furthermore, it is assumed that the AP #2 and the AP #3 are consecutively in a non-congested state.

In S19, because none of the AP #1, the AP #2, and the AP #3 is congested, the beacon transmission and the transmission of the probe response with the terminal wireless communication IF 101 is resumed (OP15 in FIG. 10 and OP42 in FIG. 11B).

<Operational Effect of the First Embodiment>

According to the first embodiment, the AP 1 that is not congested is selected as the next coupling destination of the coupling destination switching target terminal 2, and the selected AP 1 is notified to the other APs 1. The APs other than the AP 1 that is selected as the next coupling destination do not reply to the probe request from the coupling destination switching target terminal 2. Accordingly, because the presence of the APs other than the AP 1 that is selected as the next coupling destination is not viewed from the coupling destination switching target terminal 2, the coupling destination switching target terminal 2 performs the handover from the in-congestion AP 1 to the AP 1 that is selected as the next coupling destination. Accordingly, the congestion in the in-congestion AP 1 is reduced, and a situation where the congestion also occurs in the AP 1 that the coupling destination switching target terminal 2 performs coupling to is suppressed.

Therefore, according to the first embodiment, concentration of the coupling by the terminals on the in-congestion AP 1 is alleviated and the coupling is distributed. Furthermore, a communication interruption and the like due to the switching of the coupling destination are also suppressed, and a comfortable communication environment is provided to a user of the terminal.

Furthermore, according to the first embodiment, in addition to the terminal wireless communication IF 101, each AP 1 includes the measurement wireless communication IF 102. According to an instruction from the in-congestion AP 1, each AP 1 performs the measurement of the received electromagnetic wave strength on the utilization frequency for the terminal wireless communication IF 101 of the in-congestion AP 1, with the measurement wireless communication IF 102, and notifies the in-congestion AP 1 of the measurement terminal information. The in-congestion AP 1 determines the coupling destination switching target terminal 2 and the next coupling destination of that terminal 2, from the measurement terminal information that is notified by a different AP 1. Accordingly, the AP 1 that is present outside of a reach range of the electromagnetic wave of the terminal 2 that is disconnected by the in-congestion AP 1, or the AP 1 that is in congestion is suppressed from being selected as the next coupling destination by that terminal 2.

The AP 1 that has the lowest congestion level is selected as the next coupling destination of the coupling destination switching target terminal 2, and thus the AP 1 that is the next coupling destination accepts the coupling by the coupling destination switching target terminal 2. This suppresses the congestion. Furthermore, accordingly, the number of times that the coupling destination of the terminal 2 is switched is decreased.

Furthermore, the terminal 2 that has the greatest received electromagnetic wave strength in the measurement terminal information of the AP 1 which is selected as the next coupling destination is selected as the coupling destination switching target terminal 2, and thus the communication is suppressed from being unstable after the switching of the coupling destination by that terminal 2. This provides a more comfortable communication service.

According to the first embodiment, in a case where the measurement starting instruction from the in-congestion AP 1 is present, because the AP 1 performs the measurement of the received electromagnetic wave strength with the measurement wireless communication IF 102, power consumption and a processing load due to the measurement wireless communication IF 102 are suppressed.

Furthermore, according to the first embodiment, the terminal 2 performs an operation according to regulation of the wireless LAN, which states that when the coupling to the AP 1 is released, the probe request is transmitted, and does not perform an operation outside of a range of the regulation. For this reason, the terminal 2 may not be equipped with a function according to the first embodiment, and the wireless communication network system 100 that is described according to the first embodiment has great versatility.

Modification Example of the First Embodiment

According to the first embodiment, the in-congestion AP 1 determines the coupling destination switching target terminal 2 based on the measurement terminal information that is notified by a different AP 1. Included in the measurement terminal information are the identifier of the terminal 2 and the received electromagnetic wave strength that are detected in the utilization frequency for the in-congestion AP 1, which are notified by the different AP 1.

According to a modification example of the first embodiment, the coupling destination switching target terminal 2 is determined based in the information that is acquired from the terminal 2 that performs coupling to the in-congestion AP 1. According to the modification example of the first embodiment, a remaining capacity of a battery and information on an application in use are used as pieces of information that are acquired from the terminal 2. However, the pieces of information that are acquired from the terminal 2 are not limited to these. The remaining capacity of the battery is hereinafter referred to as an amount of remaining battery power.

According to the modification example of the first embodiment, because the information is acquired from the terminal 2, a terminal situation measurement program and a terminal situation transmission program are added to a secondary storage device of the terminal 2. A terminal situation reception program is added to the secondary storage device 13 of the AP 1.

The terminal situation measurement program is a program with which the terminal 2 acquires pieces of information on the amount of remaining battery power and the application in use with a given period. The terminal situation transmission program is a program with which the terminal 2 transmits the pieces of information on the amount of remaining battery power and the application in use, which are acquired by performing the terminal situation measurement program, to the AP 1 to which a coupling is made.

The terminal situation reception program is a program with which the AP 1 receives the pieces of information on the amount of remaining battery power and the application in use from the terminal 2. The CPU 11 of the AP 1 executes the terminal situation reception program, and thus the coupling terminal management unit 104 receives the pieces of information on the amount of remaining battery power and the application in use in the terminal 2 from the terminal wireless communication IF 101 and stores the received information in a terminal coupling management table 131.

FIG. 13 is a diagram illustrating an example of the terminal coupling management table 131 according to the modification example of the first embodiment. For entry, the terminal coupling management table 131 according to the modification example of the first embodiment includes the heading of type of application in use and the heading of amount of remaining battery power, in addition to the heading of identifier and the heading of received electromagnetic wave strength.

For example, a type of application for performing real-time communication, such as a video website and a voice over Internet protocol (IP) (VoIP), are stored under the heading of application in use. For example, a parameter for the amount of remaining battery power, which is set against a maximum value for the capacity of the battery of the terminal 2, is stored under the heading of amount of remaining battery power.

According to the first embodiment, the in-congestion AP 1 selects the AP 1 that has the lowest congestion level, as the next coupling destination, and selects the terminal 2 that is performing coupling to the in-congestion AP 1 itself and that has the greatest received electromagnetic wave strength in the AP 1 which is selected as the next coupling destination.

On the other hand, according to the modification example of the first embodiment, the coupling destination determination unit 108 of the in-congestion AP 1, for example, determines the coupling destination switching target terminal 2 in terms of the following headings in the terminal coupling management table 131: (1) amount of remaining battery power, (2) type of application, (3) received electromagnetic wave strength in this order.

First, the coupling destination determination unit 108 extracts the terminals 2 that have an amount of remaining battery power which is a threshold or above, as candidate terminals. Next, the coupling destination determination unit 108 further extracts candidate terminals 2 from the extracted terminals 2 in terms of type of application. For example, the video website has a higher priority than the VoIP, and thus the coupling destination determination unit 108 further extracts terminals 2 that are using the video website, from the terminals 2 that are extracted in terms of amount of remaining battery power.

Next, the coupling destination determination unit 108 selects a terminal 2 that has the lowest received electromagnetic wave strength in the coupling terminal management table 132, as a coupling destination switching target, from the terminals 2 that are selected as the candidates. In this case, an AP 1 that has the greatest received electromagnetic wave strength of the coupling destination switching target terminal 2 in the measurement terminal information, is selected as the next selection destination.

In a terminal coupling management table 131 that is illustrated in FIG. 13, for example, in a case where a threshold of the amount of remaining battery power is 40%, a terminal B, which is using the type of application, that is, the video website, with the amount of remaining battery power being 80%, is selected as the coupling destination switching target. However, a method of determining the coupling destination switching target terminal 2 is not limited to this.

According to the modification example of the first embodiment, the coupling destination switching target terminal 2 is selected, additionally using the amount of remaining battery power that is obtained from the terminal 2 and a type of application in communication. In a case where the terminal 2 that has a small amount of remaining battery power is selected as the coupling destination switching target, there is a concern that battery power will be further consumed due to the handover. According to the first embodiment, because the terminal 2 that has an amount of remaining battery power which is the threshold or above is selected as the coupling destination switching target, power consumption is suppressed in the terminal 2 that has a small amount of remaining battery power.

Furthermore, when terminal 2 that is using an application for performing real-time communication, such as the VoIP is caused to perform the handover, there is a concern that the user will remarkably feel that the communication is temporarily disconnected due to the switching of the AP 1 that is the coupling destination. According to the first embodiment, because the terminal 2 that is using the application for performing the real-time communication has a lower priority, a comfortable communication environment is provided to the terminal 2 that is using the application for performing the real-time communication.

Second Embodiment

According to the first embodiment, when the congestion level of the terminal wireless communication IF 101 is the congestion threshold or above, the congestion is detected, and the detection of that congestion causes the terminal coupling control processing to start. According to the second embodiment, the detection of movement of the terminal 2 that is performing coupling without the detection of the congestion causes the terminal coupling control processing to start. That is, the first-phase processing of the terminal coupling control processing is different from that according to the first embodiment. Description of what the second embodiment has in common with the first embodiment is hereinafter omitted. Moreover, a hardware configuration and functional constituents of an AP 1 according to the second embodiment are the same as those according to the first embodiment.

Figure 14:
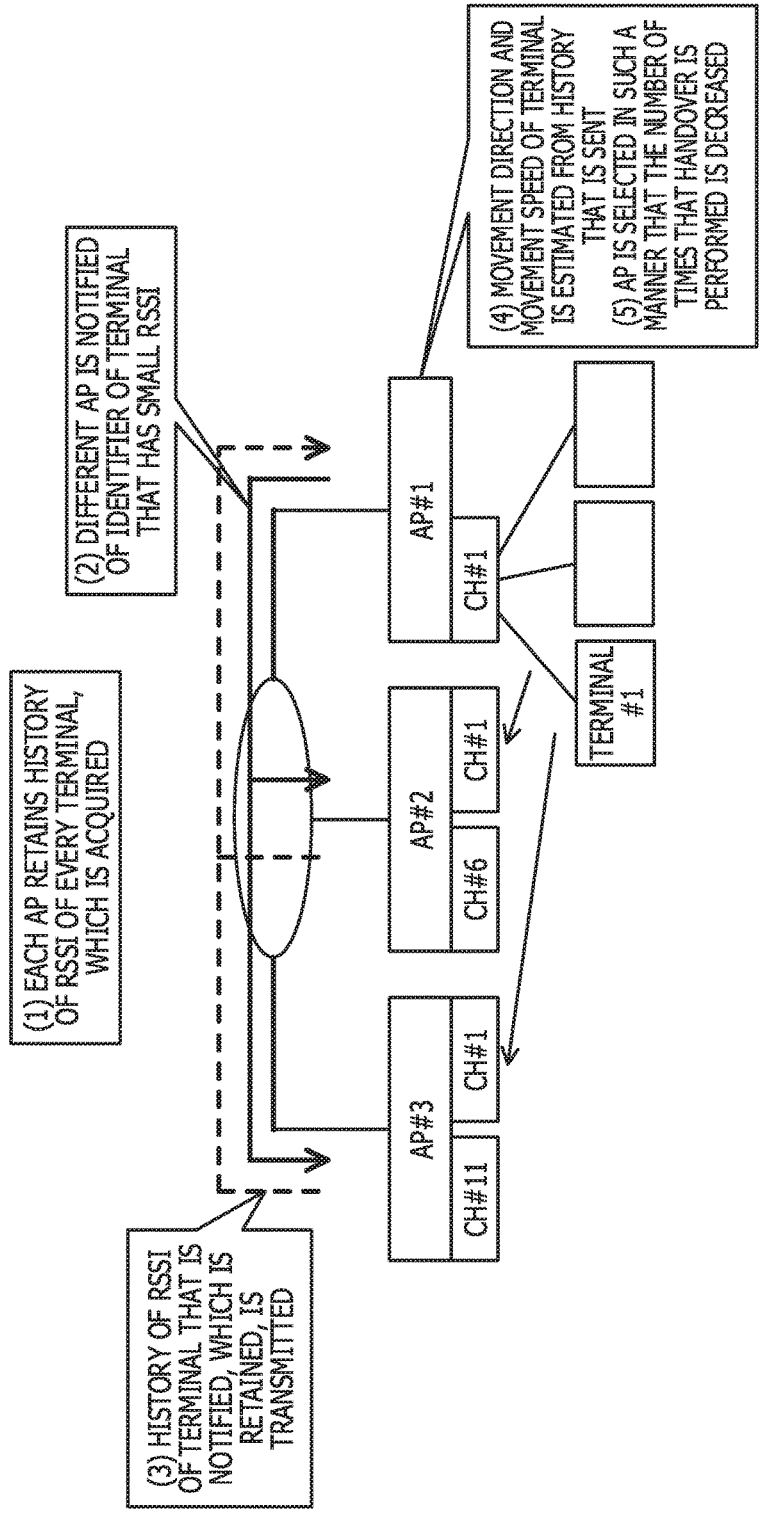
FIG. 14 is a diagram illustrating an example of a flow of first-phase processing of terminal coupling control processing according to a second embodiment.

FIG. 14 is a diagram illustrating an example of a flow of a first-phase processing of terminal coupling control processing according to the second embodiment. In FIG. 14, the wireless communication network system 100 in FIG. 3 is illustrated, and it is assumed that the terminal #1 is present at a location where the terminal #1 is able to receive the beacon from any one of the AP #1, the AP #2, and the AP #3. The terminal #1 is assumed to move in the direction of AP #2. The AP #3 is assumed to be positioned at a destination in the direction of the AP #2.

(1) Each AP 1 measures the received electromagnetic wave strength on a channel for a different AP 1 in the vicinity with a given period with the measurement wireless communication IF 102, and retains measurement histories including a measurement point in time, the detected terminal 2, and the received electromagnetic wave strength, for a given time. In a case where multiple other APs 1 are present in the vicinity, setting of the frequency for the measurement wireless communication IF 102 is switched while tuning in to the utilization channel for each AP 1 in the vicinity, but the utilization channel for each AP 1 in the vicinity is monitored by including multiple measurement wireless communications IF.

(2) The AP #1 detects that the received electromagnetic wave strength of the terminal #1 that performs coupling to the terminal wireless communication IF 101 is below a movement detection threshold. The AP #1 detects the movement of the terminal #1, and notifies other APs #2 and AP #3 in the vicinity of the identifier of the terminal #1. The movement detection threshold is a threshold that is used to detect the movement of the terminal 2. The movement detection threshold, for example, is set to approximately the same value as the received electromagnetic wave strength that is measured in a case where the terminal 2 is positioned around a boundary of an area in the reach range of the electromagnetic wave of the AP 1.

(3) When notified of the identifier of the terminal #1 by the AP #1, each of the AP #2 and the AP #3 notifies the AP #1 of a history of the terminal #1 among the measurement histories of the received electromagnetic wave strength that is measured with the measurement wireless communication IF 102. For example, the time for which the history is set by the manager to be in a range of several seconds to several minutes.

(4) The AP #1 estimates a movement direction and movement speed of the terminal #1 from the histories of the received electromagnetic wave strength of the terminal #1, which are received from the AP #2 and the AP #3. The AP #1 recognizes the movement direction of the terminal #1, using a position of the AP 1, for example, like the expression a direction in which the AP #2 is positioned. Furthermore, the movement direction of the terminal #1 is estimated by specifying the AP 1 that retains the history of the received electromagnetic wave strength, in which the received electromagnetic wave strength of the terminal #1 increases with the passage of time.

Movement speed of the terminal #1 is estimated from a change in the received electromagnetic wave strength of the terminal #1 in the history in at least two APs 1. The AP 1 estimates the movement speed of the terminal #1 from the history of the received electromagnetic wave strength of the terminal #1, which is received from a different AP 1. For example, the AP 1 retains, in advance, a relationship between a distance between the AP 1 and the terminal 2 and the received electromagnetic wave strength, acquires a change in the distance between the AP 1 and the terminal 2 from a change in the received electromagnetic wave strength, and acquires a movement distance. Furthermore, the AP 1 acquires the time demanded for the movement of the terminal #1, from the measurement point in time of the received electromagnetic wave strength in the history. The AP 1 acquires an estimation value of the movement speed of the terminal #1 by dividing the acquired movement history by the time demanded for the acquired movement.

(5) The AP #1 selects the next coupling destination in such a manner that the number of times that the terminal #1 performs the handover decreases. For example, in FIG. 14, in a case where the terminal #1 moves in the direction of the AP #2, the AP #3 that is positioned farther from the AP #1 than the AP #2 is selected as the next coupling destination. Accordingly, in a case where the terminal #1 continues to move farther from the AP #2 toward the direction of the AP #3, the terminal #1 can omit the switching of the coupling destination to the AP #2. However, a condition that the AP has to be selected as the next coupling destination is that the congestion level is below the congestion threshold.

The second-phase processing after it is determined that the AP 1 is the next coupling destination of the terminal #1 is the same as that according to the first embodiment. That is, the AP #1 notifies the AP #2 and the AP #3 of the switch terminal information including the identifier of the terminal #1 and the identifier of the AP #3 as the next coupling destination. The AP #2 and the AP #3 reply to a probe request from the terminal 2, which is notified along with the identifier of the host AP 1, but does not reply to probe requests from terminals 2 other than that probe request.

Accordingly, in a case where the terminal #1 moves in the direction from the AP #1 to the AP #2 to the AP #3, the terminal #1 performs the handover from the AP #1 to the AP #3, not the handover from the AP #1 to the AP #2 and from the AP #2 to the AP #3. Therefore, the number of times that the terminal 2 in motion performs the handover is decreased, and the number of times that the communication is interrupted momentarily is reduced.

FIG. 15 is a diagram illustrating an example of a RSSI change history management table. The RSSI change history management table is table for storing the history of the measurement of the received electromagnetic wave strength on the utilization channel for a different AP 1 in the vicinity with the measurement wireless communication IF 102 of the AP 1. The RSSI change history management table is retained in the secondary storage device 13 of the AP 1.

In FIG. 15, an RSSI change history table for one terminal 2 is illustrated. For entry, the heading of time and the heading of received electromagnetic wave strength are included in the RSSI change history management table that is illustrated in FIG. 15. A point in time at which the measurement is performed is stored under the heading of time. The received electromagnetic wave strength that is the measurement result is stored under the heading of received electromagnetic wave strength.

As many RSSI change history management tables as the number of terminals that are detected by the measurement of the received electromagnetic wave strength are present. Furthermore, as many pieces of information as the length of a given time are stored in the RSSI change history management table, and when, for entry, new information is stored, the oldest information is deleted. Furthermore, although, for entry, new information is not stored, when the given time elapsed, information is deleted. The length of the given time for which the information is retained in the RSSI change history management table, for example, is on the minute basis, such as on the one-minute basis, and is able to be arbitrarily set by the manager. Moreover, the received electromagnetic wave strength on the utilization channel for the host AP 1 is also stored in the RSSI change history management table.

According to the second embodiment, the measurement wireless communication IF 102 and the measurement terminal management unit 106 are activated along with the AP 1. The measurement wireless communication IF 102 measures the received electromagnetic wave strength with a given period, while tuning in to the utilization channel for each AP 1 in the vicinity. When the result of the measurement is input from the measurement wireless communication IF 102, the measurement terminal management unit 106 stores the result of the measurement in the RSSI change history management table of the terminal 2.

In a case where the notification of the identifier of the terminal 2 from a different AP 1 is received, the measurement terminal management unit 106 receives an instruction from the AP control unit 107, and outputs the RSSI change history management table of the terminal 2 that is designated by the notification to the AP control unit 107. The RSSI change history management table transmits the AP 1 that is the notification source, through the AP communication IF 103. In the AP 1 that is the notification source, the coupling destination determination unit 108 determines the next coupling destination of the terminal 2 of which the movement is detected, based on the RSSI change history management table that is received from a different AP 1 in the vicinity. A method of measuring the next coupling destination of the terminal 2 of which the movement is detected will be described in detail below.

Figure 16:
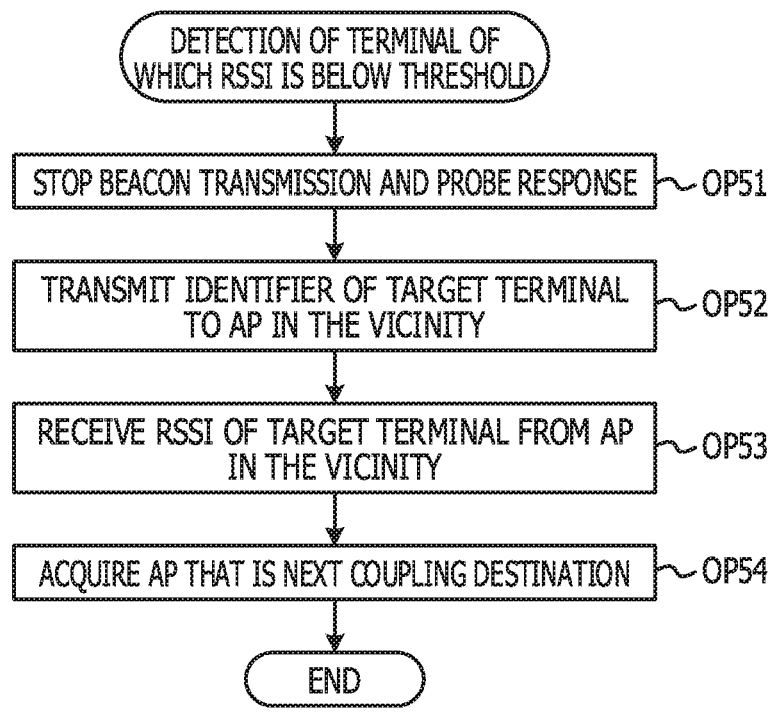
FIG. 16 is a flowchart illustrating an example of the processing by the AP control unit in a first phase of the terminal coupling control processing according to the second embodiment.

FIG. 16 is a flowchart illustrating an example of a flowchart of the processing by the AP control unit 107 in a first phase of terminal coupling control processing according to the second embodiment. When the movement of the terminal 2 that is performing coupling to the host AP 1 is detected, the processing that is illustrated in FIG. 16 starts. The movement of the terminal 2 is detected by the coupling terminal management unit 104. In a case where the received electromagnetic wave strength of any terminal 2, which is input from the terminal wireless communication IF 101, is below the movement detection threshold, the coupling terminal management unit 104 detects the movement of the terminal 2. The terminal 2 of which the movement is detected is hereinafter referred to as a target terminal 2.

In OP51, the AP control unit 107 instructs the beacon control unit 111 and the probe response control unit 110 to stop the beacon transmission and the transmission of the probe response, respectively, from the terminal wireless communication IF 101. Next, the processing proceeds to OP52.

In OP52, the AP control unit 107 transmits the identifier of the target terminal 2 to a different AP 1 through the AP communication IF 103. Next, the processing proceeds to OP53.

In OP53, the AP control unit 107 receives the history (the RSSI change history table) of the received electromagnetic wave strength of the target terminal 2 from a different AP 1 through the AP communication IF 103. The completion of the procession in OP53, for example, is determined by receiving the history from all the APs 1 that are registered in the neighboring AP management table 133 or by a given time having elapsed after the transmission of the identifier of the target terminal 2. Next, the processing proceeds to OP54.

In OP54, the AP control unit 107 instructs the coupling destination determination unit 108 to determines the next coupling destination of the target terminal 2, and acquires the AP 1 of the next coupling destination of the target terminal 2 from the coupling destination determination unit 108. Thereafter, the processing that is illustrated in FIG. 16 ends, and next, the second-phase processing in FIG. 10 starts in the same manner as in the first embodiment.

Figure 17:
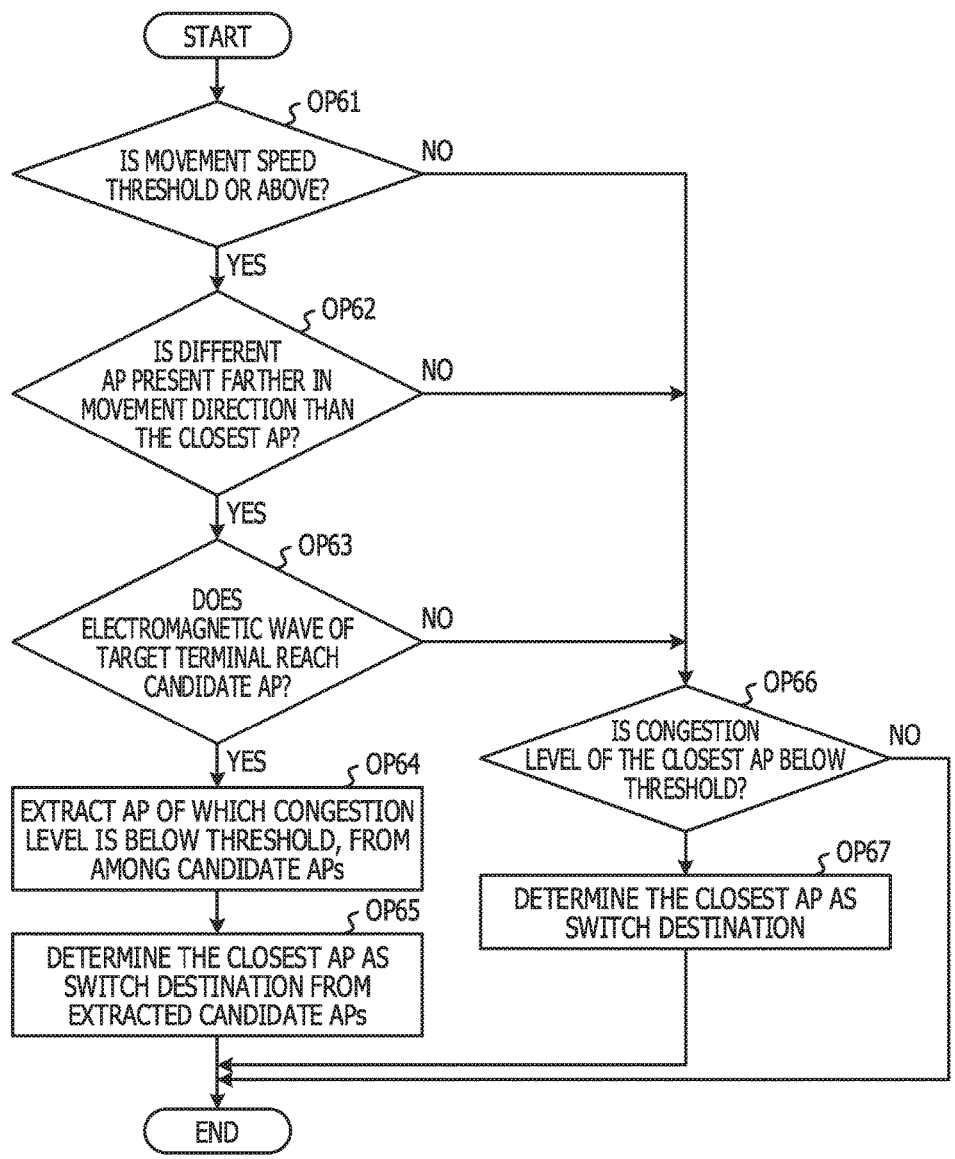
FIG. 17 is a flowchart illustrating an example of processing by a coupling destination determination unit, which determines a next coupling destination of a target terminal.

FIG. 17 is a flowchart illustrating an example of processing by the coupling destination determination unit 108, which determines the next coupling destination of the target terminal 2. When an instruction to determine the next coupling destination of the target terminal 2 is input from the AP control unit 107, the processing that is illustrated in FIG. 17 starts.

In OP61, the coupling destination determination unit 108 determine whether or not movement speed of the target terminal 2 is a speed threshold or above. The speed threshold is arbitrarily set by the manager to be within walking speed of the user. In a case where the movement speed of the target terminal 2 is the speed threshold or above (Yes in OP61), the processing proceeds to OP62. In a case where the movement speed of the target terminal 2 is below the speed threshold (No in OP61), the processing proceeds to OP66.

In OP62, the coupling destination determination unit 108 determines whether or not a different AP 1 is present farther in the movement direction of the target terminal 2 than the AP 1 that is the closest to the host AP 1. The position of the different AP 1 is retained in advance. In a case where the different AP 1 is present farther in the movement direction of the target terminal 2 than the AP 1 that is the closest to the host AP 1 (Yes in OP62), the processing proceeds to OP63. In a case where the different AP 1 is not present farther in the movement direction of the target terminal 2 than the AP 1 that is the closest to the host AP 1 (No in OP62), the processing proceeds to OP66. The AP 1 that is present farther in the movement direction of the target terminal 2 than the AP 1 that is the closest to the host AP 1 is referred to as a candidate AP.

In OP63, the coupling destination determination unit 108 determine whether or not an electromagnetic wave of the target terminal 2 reaches the candidate AP 1. It is illustrated that if the RSSI change history management table of the target terminal 2 is received from the candidate AP 1, the electromagnetic wave of the target terminal 2 reaches the candidate AP 1. In a case where the electromagnetic wave of the target terminal 2 reaches the candidate AP 1 (Yes in OP63), the processing proceeds to OP64. In a case where the electromagnetic wave of the target terminal 2 does not reach the candidate AP 1 (No in OP63), the processing proceeds to OP66.

In OP64, the coupling destination determination unit 108 extracts the AP 1 of which the congestion level is below the congestion threshold, from candidates APs 1, and the extracted AP 1 is set to be a new candidate AP 1. Next, the processing proceeds to OP65. Moreover, in a case where the AP 1 of which the congestion level is below the congestion threshold is not present, the processing may proceed to OP66.

In OP65, the coupling destination determination unit 108 determines the AP 1 that is the closest to the AP 1, among the APs 1 that are extracted from the candidates APs 1, as the next coupling destination, and notifies the AP control unit 107 of the determined AP 1. Thereafter, the processing that is illustrated in FIG. 17 ends.

In OP66, it is determined whether or not the congestion level of the AP 1 that is the closest to the host AP 1 is below the congestion threshold. In a case where the congestion level of the AP 1 that is the closest to the host AP 1 is below the congestion threshold (Yes in OP66), the processing proceeds to OP67. In a case where the congestion level of the AP 1 that is the closest to the host AP 1 is the congestion threshold or above (No in OP66), the coupling destination determination unit 108 notifies the AP control unit 107 that there is no next coupling destination, and ends the processing that is illustrated in FIG. 17. In this case, the AP 1 does not release a coupling to the target terminal 2.

In OP67, the coupling destination determination unit 108 determines the AP 1 that is the closest to the host AP 1, as the next coupling destination, and notifies the AP control unit 107 of the determined AP 1. Thereafter, the processing that is illustrated in FIG. 17 ends.

Moreover, in an example that is illustrated in FIG. 17, the AP 1 that is the closest to the host AP 1 is selected as the next coupling destination of the target terminal 2, from among the candidate APs 1, but a method of selecting the next coupling destination of the target terminal 2 is not limited to this. Although the AP 1 that is the closest to the host AP 1 is selected from among the candidate APs 1, the AP 1 that is positioned between the AP 1 that is the closest to the host AP 1 and the AP 1 that is the farthest from the host AP 1 may be selected as the next coupling destination of the target terminal 2.

Figure 18:
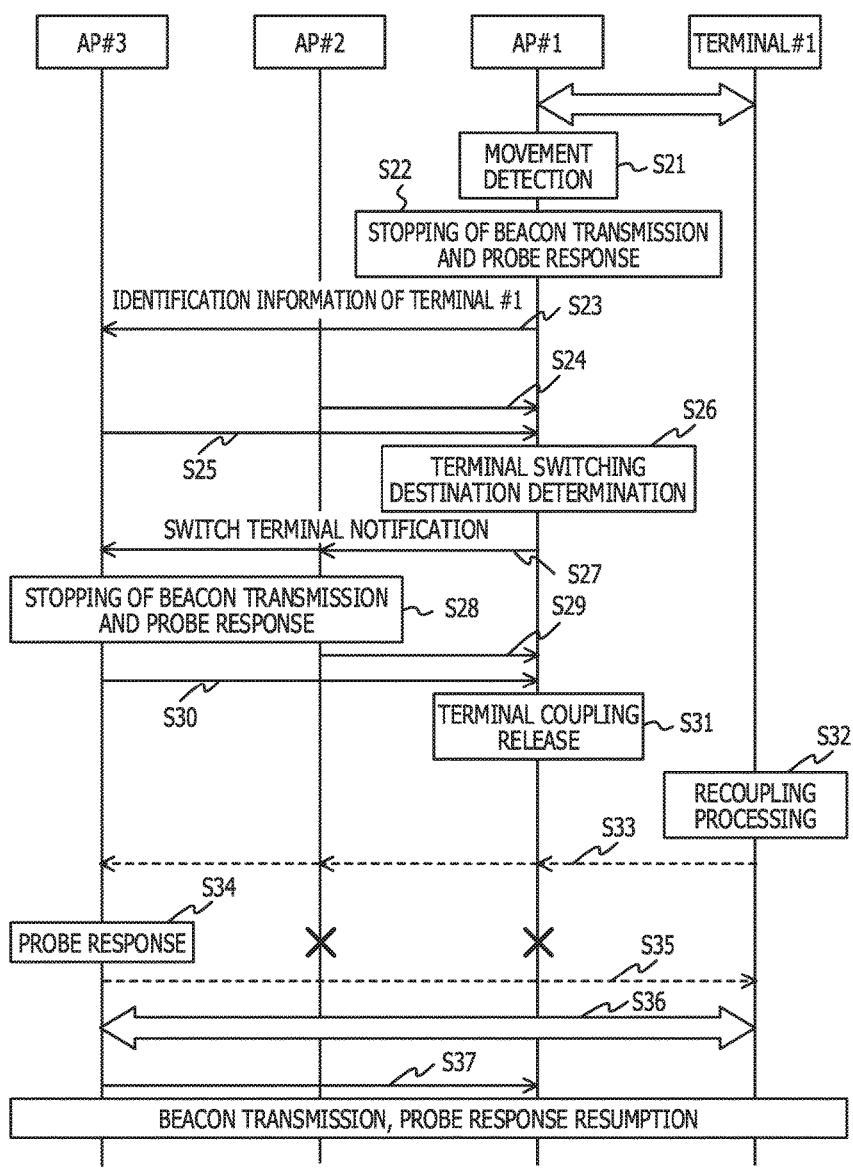
FIG. 18 is a diagram illustrating an example of a sequence of the terminal coupling control processing according to the second embodiment.

FIG. 18 is a diagram illustrating an example of a sequence of the terminal coupling control processing according to the second embodiment. In an example that is illustrated in FIG. 18, output strengths of electromagnetic waves of the AP #1, the AP #2, the AP #3 are assumed to be same. Furthermore, it is assumed that the AP #1 is positioned the closest to the terminal #1, the AP #2 is positioned the second closest to the terminal #1, and the AP #3 is positioned the third closest to the terminal #1. In the example that is illustrated in FIG. 18, the terminal #1 performs coupling to the AP #1 and performs communication. Furthermore, it is assumed that the congestion is not detected from any of the AP #1, the AP #2, and the AP #3.

In S21, the AP #1 detects the movement of the terminal #1 of which the received electromagnetic wave strength is below a given threshold. In S22, the AP #1 stops the beacon transmission and the transmission of the beacon transmission from the terminal wireless communication IF 101 (OP51 in FIG. 16).

In S23, the AP #1 notifies a different AP 1 in the vicinity of the identifier of the terminal #1 (OP52 in FIG. 16). This notification may be transmitted by any one of broadcasting, multicasting, and unicasting.

In S24 and S25, the AP #2 and the AP #3, respectively, transmit the RSSI change history management table of the terminal #1 to the AP #1. Moreover, the RSSI change history management table of the terminal #1 is transmitted by unicasting with the AP #1 as a destination.

In S26, the AP #1 receives the RSSI change history management table of the terminal #1 from the AP #2 and the AP #3 (OP53 in FIG. 16), and determines the next coupling destination of the terminal #1 (OP54 in FIG. 16). It is assumed that the AP #1 detects that the terminal #1 moves in the direction of the AP #2 and that the AP #3 that is positioned farther in the movement direction of the terminal #1 than the AP #2 is selected as the next coupling destination of the terminal #1.

In S27, the AP #1 transmits the switch terminal information (OP11 in FIG. 10). The identifier of the terminal #1 and the identifier of the AP #3 are included, in a state of being associated with each other, in the switch terminal information that is transmitted from the AP #1 in S27. The switch terminal information may be transmitted by any one of broadcasting, multicasting, and unicasting.

In S28, each of the AP #2 and the AP #3 receives the switch terminal information (Yes in OP31 in FIG. 11B), and stops the beacon transmission and the transmission of the probe response with the terminal wireless communication IF 101 (OP33 and OP35 in FIG. 11B).

In S29, because the identifier of the host AP is not included in the switch terminal information, when the processing in S28 ends, without any change, the AP #2 transmits the setting completion notification to the AP #1 (OP34 in FIG. 11B).

In S30, because with the switch terminal information, the AP #3 is designated as the next coupling destination, the setting is performed in such a manner that the probe response to the probe request from the terminal #1 is transmitted (OP36 in FIG. 11B) and the setting completion notification is transmitted to the AP #1 (OP37 in FIG. 11B).

In S31, the AP #1 receives the setting completion notification from the AP #2 and the AP #3 (OP12 in FIG. 10), and releases a coupling to the terminal #1 (OP13 in FIG. 10).

In S32, because the coupling is released by the AP #1, the terminal #1 starts re-coupling processing in order to perform the handover. In S33, as one of the re-coupling processing operations, the terminal #1 transmits the probe request on the utilization channel for the terminal wireless communication IF 101 of each of the AP #1, and the AP #2, and the AP #3.

In S34, the AP #3 receives the probe request from the terminal #1 (OP38 in FIG. 11B), and transmits the probe response to the terminal #1 (OP39 in FIG. 11B). Because the AP #1 and the AP #2 also receives the probe request from the terminal #1, but because the transmission of the probe response is stopped, the probe response is not transmitted to the terminal #1.

In S35, the terminal #1 receives the probe response from the AP #3. Because the probe response is not transmitted from the AP #1 and the AP #2 to the terminal #1, the terminal #1 recognizes the presence of the AP #3, but does not recognize the presence of the AP #1 and the AP #2. In S36, the terminal #1 performs coupling to the AP #3 of which the presence the terminal #1 recognizes.

In S37, the AP #3 transmits the coupling completion notification to the AP #1 (OP40 in FIG. 11B). In S38, because none of the AP #1, the AP #2, and the AP #3 is congested, the beacon transmission and the transmission of the probe response with the terminal wireless communication IF 101 is resumed (OP15 in FIG. 10 and OP42 in FIG. 11B).

<Operational Effect of the Second Embodiment>

In the example that is illustrated in FIG. 18, when the terminal #1 moves in the direction of the AP #2 and the AP #1 detects the movement of the terminal #1, the AP #3 is selected as the next coupling destination of the terminal #1. Accordingly, in a case where the terminal #1 moves in the direction from the AP #1 to the AP #2 to the AP #3, the handover from the AP #1 to the AP #2 is omitted. Accordingly, the number of times that the communication with the terminal #1 is momentarily interrupted is reduced. Furthermore, because the AP #1 excludes the AP 1 that is in congestion, from the candidate for the next coupling destination of the target terminal, the coupling by the terminal #1 to the AP 1 that is in congestion is suppressed and local concentration of the coupling by the terminals is suppressed.

Furthermore, after the terminal #1 switches the coupling destination to the AP #3, in a case where the user of the terminal #1 stops in the vicinity of the AP #2 or changes the direction, the AP #3 detects that the terminal #1 is positioned at a great distance and performs the coupling destination switching described above. As a result, the coupling destination of the terminal #1 is switched from the AP #3 to a different AP 1.

Furthermore, in a case where the terminal #1 moves in a different direction from that estimated, and the coupling destination that is the AP #3 is not switched, the terminal #1 performs coupling to the AP 1 that has the greatest received electromagnetic wave strength, at a timing when the AP #1, the AP #2, and the AP #3 resumes the beacon transmission and the transmission of the probe response.

Third Embodiment

According to the first and second embodiments, the next coupling destination of the terminal that have made a coupling to the AP 1 is determined. According to a third embodiment, even in a case where a new terminal that does not perform coupling to any AP 1 performs the coupling processing, the AP 1 performs control in such a manner that a coupling to the AP 1 that is not congested can be made. A description of what the third embodiment has in common with the first and second embodiments is omitted. Moreover, a hardware configuration of an AP 1 according to the third embodiment is the same as that according to the first embodiment.

According to the third embodiment, when the AP 1 detects the congestion in the host AP 1, the AP 1 stops the beacon transmission and the transmission of the probe response in such a manner that the coupling by the terminal 2 is no longer accepted. Along with this, based on the congestion level of a different AP 1, the AP 1 selects the AP 1 that is not congested, as the coupling destination, notifies the different AP 1 of the selected AP 1, and performs setting in such a manner that the selected AP 1 replies to the probe request of a new terminal 2.

Additionally, according to the third embodiment, the AP 1 controls the congestion level that is mutually exchanged between the AP 1 and a different AP 1, based on the history of the past congestion level. For example, there is a high likelihood that the congestion will also occur at a current point in time during a period of time, the history for which indicates that the congestion occurred in the past. For this reason, in order to suppress the concentration of coupling by new terminals 2 in advance, even in a case where the congestion does not occur actually, the AP 1 changes the congestion level to a value that is greater than is assigned to the actual congestion level, and transmits the changed congestion level to a different AP 1. Accordingly, because the congestion appears to occur when viewed from a different AP 1, this decreases the likelihood that the host AP 1 will be selected as the coupling destination of a new terminal 2.

Figure 19:
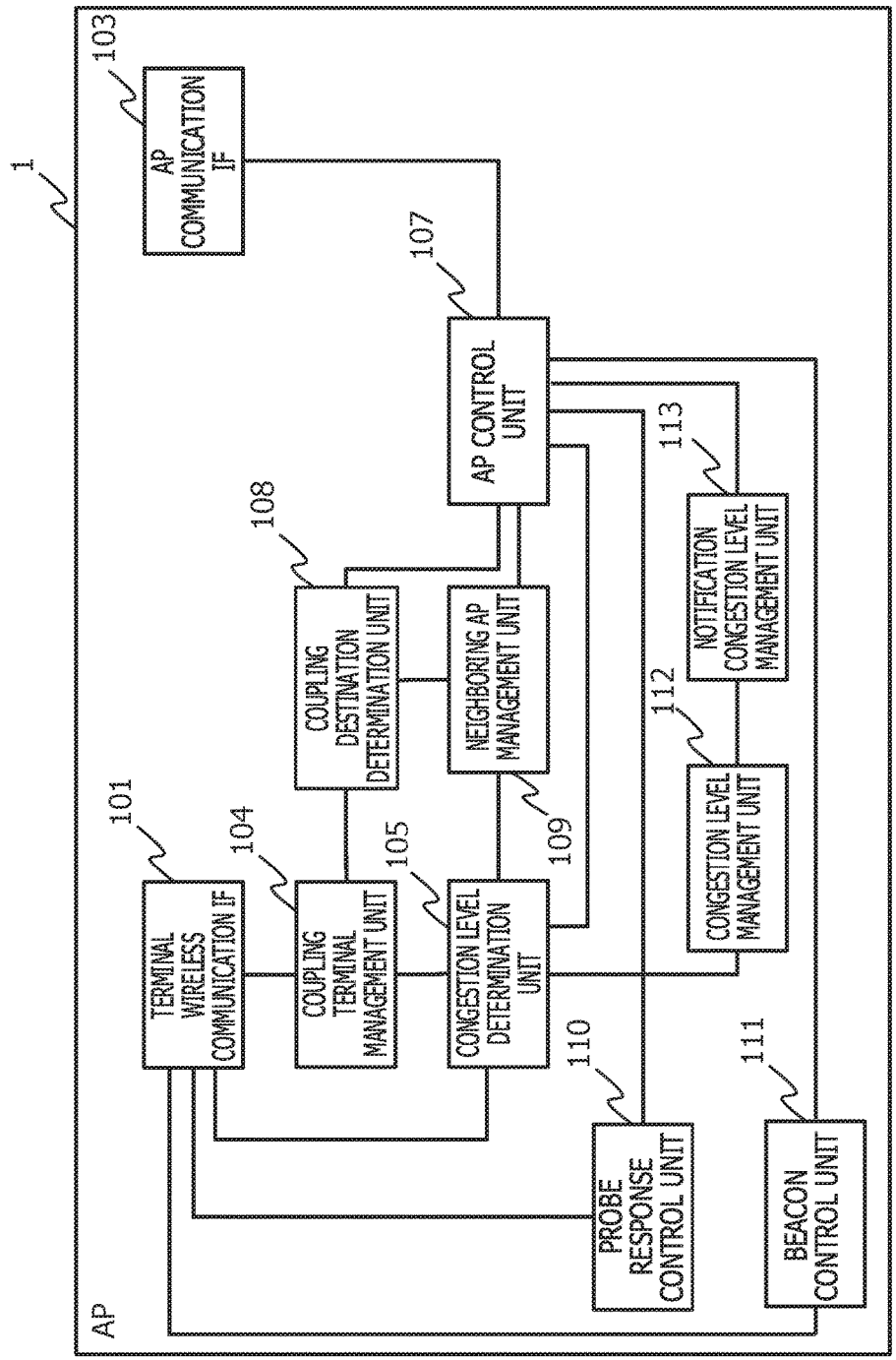
FIG. 19 is a diagram illustrating an example of functional constituents of an AP according to a third embodiment.

FIG. 19 is a diagram illustrating an example of functional constituents of the AP 1 according to the third embodiment. As the functional constituents, the AP 1 includes the terminal wireless communication IF 101, the AP communication IF 103, the coupling terminal management unit 104, the congestion level determination unit 105, the AP control unit 107, the coupling destination determination unit 108, the neighboring AP management unit 109, the probe response control unit 110, the beacon control unit 111, a congestion level management unit 112, and a notification congestion level determination unit 113. These functional constituents are functions that are accomplished by the execution by the CPU 11 of the AP 1 of the terminal coupling control program 13P that is stored in the secondary storage device 13.

The terminal wireless communication IF 101, the AP communication IF 103, the coupling terminal management unit 104, the congestion level determination unit 105, the AP control unit 107, the coupling destination determination unit 108, the neighboring AP management unit 109, the probe response control unit 110, and the beacon control unit 111 are as described according to the first embodiment.

According to the third embodiment, the congestion level determination unit 105 outputs the congestion level to the neighboring AP management unit 109 and the congestion level management unit 112. A period with which the congestion level is calculated, for example, is arbitrarily set by the manager on the minute basis, such as on the one-minute basis.

The congestion level management unit 112 receives the congestion level from the congestion level determination unit 105, and manages the congestion level of the host AP 1. Specifically, the congestion level management unit 112 calculates an average congestion level for every given unit time, and stores a history of the average congestion level in an average congestion level history management table that will be described below. For example, the given unit time for which the average congestion level is calculated is set by the manager at intervals of several minutes to several hours.

The notification congestion level determination unit 113 measures the congestion level that is notified to a different AP 1, from a past congestion level and a current congestion level. The congestion level that is notified to the different AP 1 is hereinafter referred to as a notification congestion level. For example, in a case where a congestion level for the same period of time in the past as a current period of time indicates that the congestion occurred, the notification congestion level determination unit 113 sets the notification congestion level to be higher than the current congestion level, in such a manner that the coupling by the terminals 2 is not concentrated on the host AP1. Processing by the notification congestion level determination unit 113 will be described in detail below.

FIG. 20 is a diagram illustrating an example of the average congestion level history management table. The average congestion level history management table is a table that contains the history of the average congestion level which is an average value per unit time of the congestion levels of the host AP 1. The average congestion level history management table is retained in the secondary storage device 13 of the AP 1.

In the average congestion level history management table that is illustrated in FIG. 20, the unit time is 30 minutes. Furthermore, in the average congestion level history management table that is illustrated in FIG. 20, the average congestion level is stored for every period of time that results from dividing one day by 30 minutes. In an example that is illustrated in FIG. 20, the congestion level is a wireless occupancy rate of the terminal wireless communication IF 101, and is illustrated as a percentage.

FIG. 21 is a diagram illustrating an example of the congestion level that is exchanged between the AP #1, the AP #2, and the AP #3 for a period of time from 13:00 to 13:30 on Tuesday. The average congestion level of the AP #1 for the same period of time on the last Tuesday is 20 and the current congestion level is 30. The average congestion level of the AP #2 for the same period of time on the last Tuesday is 70 and the current congestion level is 30. The average congestion level of the AP #3 for the same period of time on the last Tuesday is 30 and the current congestion level is 50. The average congestion level for the same period of time one week ago as the current period of time is hereinafter referred to as a "preceding average congestion level".

The AP 1 acquires the preceding average congestion level of the host AP 1 from the average congestion level history management table. With the notification from the different AP 1, the AP 1 acquires the preceding average congestion level of a different AP 1, along with the congestion level of the different AP 1.

According to the third embodiment, the AP 1 determines the notification congestion level, with an average value of the preceding average congestion level of the host AP 1 and the preceding average congestion level of a different AP 1 as a congestion estimation threshold. The congestion estimation threshold is a threshold for estimating the occurrence of the congestion.

(1) In a case where a current congestion level of any AP 1 is a congestion level estimation threshold or above, the notification congestion level is assumed to be the current congestion level.

(2) In a case where the current congestion level is below the congestion level estimation threshold, the congestion level estimation threshold of the AP 1 that is expected to be congested is assumed to be the notification congestion level. The AP 1 that is expected to be congested is the AP 1 of which the preceding average congestion level is the congestion level estimation threshold or above.

(3) In a case where the current congestion level is below the congestion level estimation threshold, the notification congestion level of an AP 1 other than the AP 1 that is expected to be congested is assumed to be a value that is smaller than is assigned to the notification congestion level of the AP 1 that is expected to be congested.

In an example that is illustrated in FIG. 21, the congestion level estimation threshold is 40 that is an average value of the preceding average congestion level. Furthermore, the AP #2 of which the preceding average congestion level is the congestion level estimation threshold (40) or above is the AP 1 that is expected to be congested.

Because the AP #1 is not the AP 1 that is expected to be congested and the current congestion level of the AP #1 is 30 that is below the congestion level estimation threshold (40), the notification congestion level of the AP #1 is determined as 10 that is a value smaller than the notification congestion level 40 of the AP #2 that is expected to be congested. Because the AP #2 is the AP 1 that is expected to be congested and the current congestion level of the AP #2 is 30 that is below the congestion level estimation threshold (40), the notification congestion level of the AP #2 is determined as the congestion level estimation threshold (40). Because the current congestion level of the AP #3 is 50 that is the congestion level estimation threshold (40) or above, the notification congestion level of the AP #3 is determined as the current congestion level (50).

On the assumption of a state of the congestion level of each AP 1 that is illustrated in FIG. 21, when the AP #3 detects the congestion, the AP #3 selects the AP 1 that is the coupling destination of a new terminal 2. For example, in a case where the AP 1 that has the lowest notification congestion level is selected as the coupling destination of a new terminal 2, the AP #3 selects the AP #1 as the coupling destination of a new terminal 2. According to the policy described above, although the notification congestion level of each AP 1 is determined and thus the AP #1 and thus the AP #2 has the same current congestion level, because the AP #2 that is expected to be congested has a greater notification congestion level, the AP #1 is selected as the coupling destination of the new terminal 2. Accordingly, control is performed in such a manner that the coupling by the new terminals 2 is not concentrated on the AP #2 that is expected to be congested.

Figure 22:
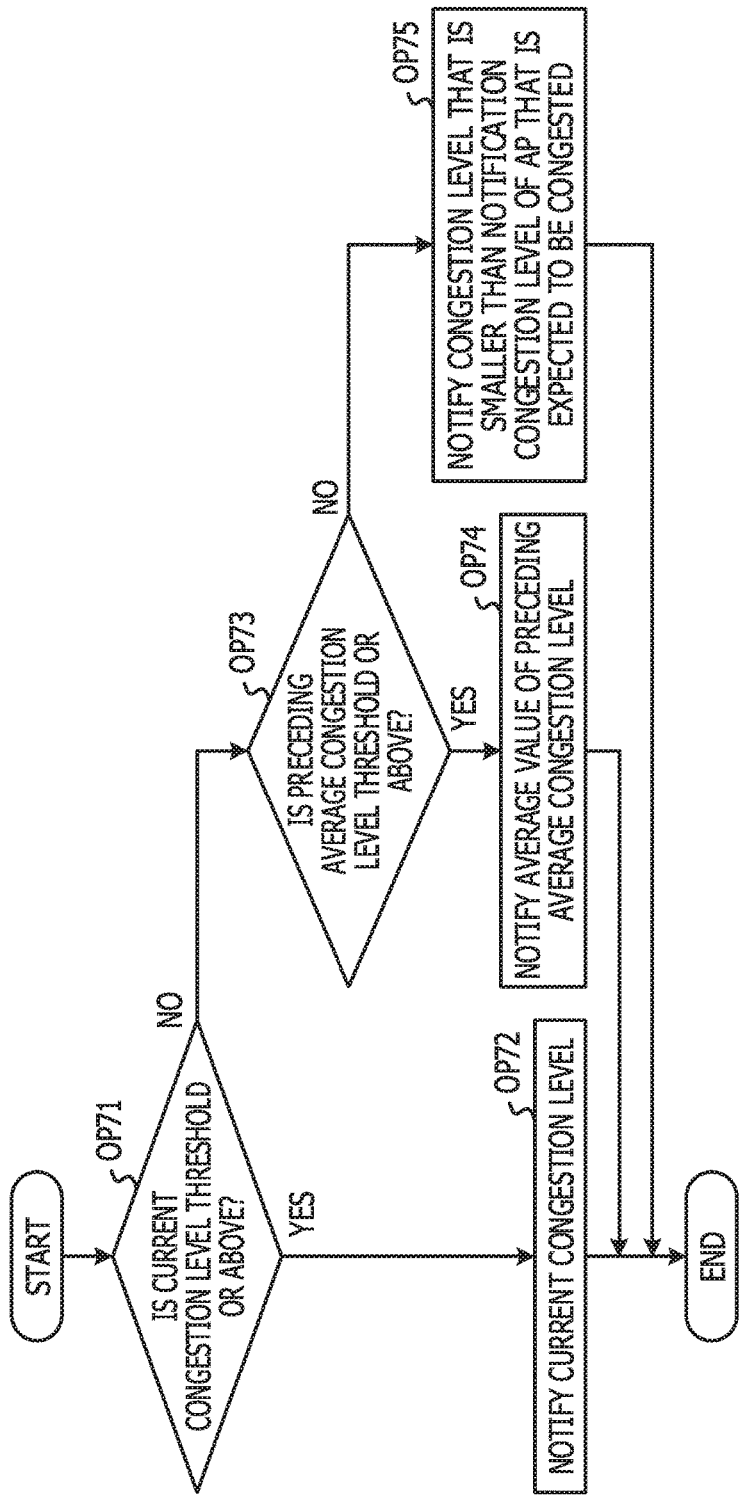
FIG. 22 is a flowchart illustrating an example of processing by a notification congestion level determination unit, which determines a notification congestion level.

FIG. 22 is a flowchart illustrating an example of processing by the notification congestion level determination unit 113, which determines the notification congestion level. When the congestion level is input from the congestion level determination unit 105 to the notification congestion level determination unit 113, the processing that is illustrated in FIG. 22 starts. That is, the processing that is illustrated in FIG. 22 is performed with a period of the calculation of the congestion level. Moreover, the period of the calculation of the congestion level, for example, is arbitrarily set by the manager on the minute basis, such as on the one-minute basis, or on the second basis.

In OP71, the notification congestion level determination unit 113 determines whether or not the current congestion level is the congestion level estimation threshold or above. The congestion level estimation threshold, for example, is an average value of the average congestion level of each AP 1 at the same point time one week ago as the current point in time and for the same period of time one week ago as the current period of time. In a case where the current congestion level is the congestion level estimation threshold or above (Yes in OP71), the processing proceeds to OP72. In a case where the current congestion level is below the congestion level estimation threshold (No in OP71), the processing proceeds to OP73.

In OP72, the notification congestion level determination unit 113 determines the current congestion level as the notification congestion level. Thereafter, the processing that is illustrated in FIG. 22 ends.

In OP73, the notification congestion level determination unit 113 determines whether or not the preceding average congestion level is the congestion level estimation threshold or above. In a case where the preceding average congestion level is the congestion level estimation threshold or above, (Yes in OP73), the processing proceeds to OP74. In a case where the preceding average congestion level is below the congestion level estimation threshold (No in OP73), the processing proceeds to OP75.

In OP74, the notification congestion level determination unit 113 determines the average value of the preceding average congestion level. Thereafter, the processing that is illustrated in FIG. 22 ends.

In OP75, because the host AP 1 is not the AP 1 that is expected to be congested, the notification congestion level determination unit 113 determines a value that is smaller than the notification congestion level of a different AP 1 that is expected to be congested, as the notification congestion level. From the AP 1 that is expected to be congested, it is possible for the manager to arbitrarily set to what extent the notification congestion level is set to be small. Thereafter, the processing that is illustrated in FIG. 22 ends.

The determined notification congestion level is output to the AP control unit 107, and is transmitted to a different AP 1 through the AP communication IF 103. Moreover, the congestion level estimation threshold is not limited to the average value of the average congestion level of each AP 1 at the same point time one week ago as the current point in time and for the same period of time one week ago as the current period of time, and for example, may be set to a fixed value. Furthermore, the congestion level estimation threshold may be the same value as a congestion level threshold.

Figure 23:
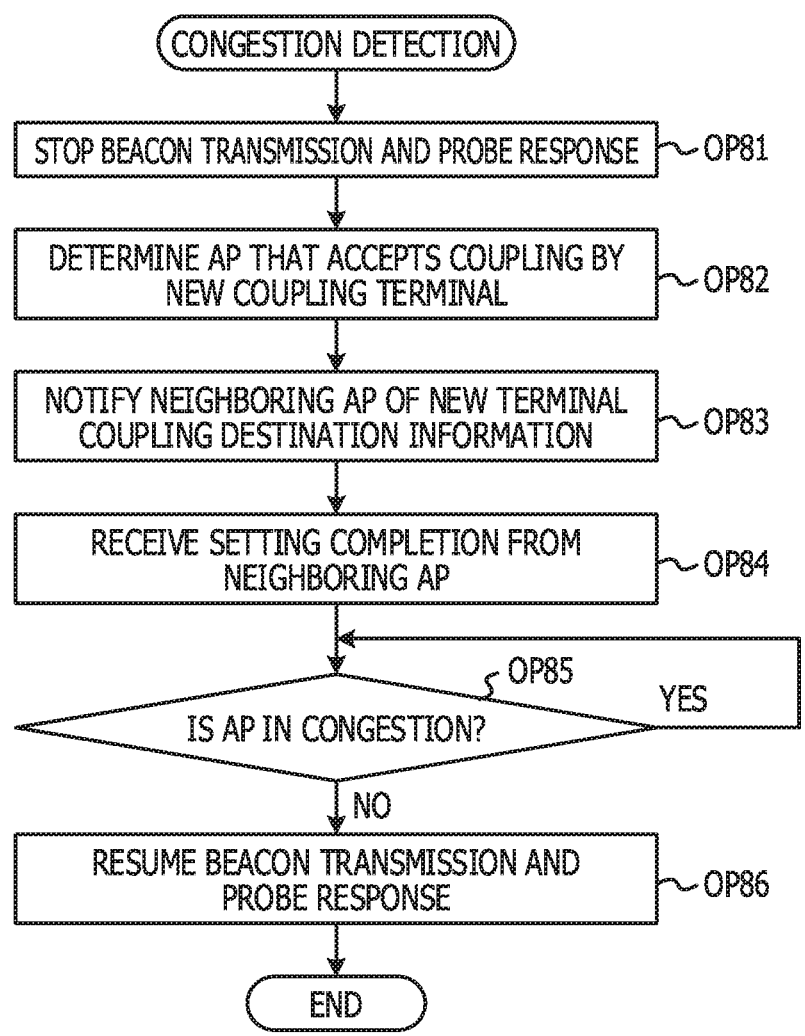
FIG. 23 is a flowchart illustrating an example of processing by an AP control unit according to the third embodiment, which is performed when congestion is detected.

FIG. 23 is a flowchart illustrating an example of processing by an AP control unit 107 according to the third embodiment, which is perform when the congestion is detected. The processing that is illustrated in FIG. 23 starts when the detection of the congestion is input from the congestion level determination unit 105.

In OP81, the AP control unit 107 instructs the beacon control unit 111 and the probe response control unit 110 to stop the beacon transmission and the transmission of the probe response, respectively. Next, the processing proceeds to OP82.

In OP82, the AP control unit 107 instructs the coupling destination determination unit 108 to determine the AP 1 that is the coupling destination of a new terminal 2, and acquires the AP 1 that is the coupling destination of the new terminal 2 from the coupling destination determination unit 108. The coupling destination determination unit 108, for example, selects the AP 1 that has the lowest notification congestion level, as the AP that is the coupling destination of the new terminal 2. Alternatively, the coupling destination determination unit 108 may select all the APs 1 that have the notification congestion level that is smaller than the congestion threshold, as the APs that are the coupling destinations of the new terminal 2. Next, the processing proceeds to OP83.

In OP83, the AP control unit 107 transmits new terminal coupling destination information including the identifier of the AP 1 that is the coupling destination of the new terminal, to a different AP 1 through the AP communication IF 103. Next, the processing proceeds to OP84.

In OP84, the AP control unit 107 receives a setting completion notification from a different AP 1 through the AP communication IF 103. For example, after a given time has elapsed from when the new terminal coupling destination information was received, the processing may proceed to OP85.

In OP85, the AP control unit 107 determines whether or not the utilization channel for the terminal wireless communication IF 101 of the host AP 1 is in congestion. The AP control unit 107 requests the congestion level determination unit 105 to determine whether or not the utilization channel for the terminal wireless communication IF 101 is in congestion. If the current congestion level is the congestion threshold or above, the congestion level determination unit 105 detects that the utilization channel for the terminal wireless communication IF 101 of the device is congested.

The AP control unit 107 is a waiting state until the congestion in the utilization channel for the terminal wireless communication IF 101 of the host AP 1 is alleviated. When the congestion in the utilization channel for the terminal wireless communication IF 101 of the host AP 1 is alleviated (No in OP85), the processing proceeds to OP86.

In OP86, because the congestion in the utilization channel for the terminal wireless communication IF 101 is alleviated, the AP control unit 107 instructs the beacon control unit 111 and the probe response control unit 110 to start the beacon transmission and the transmission of the probe response, respectively, with the terminal wireless communication IF 101. Accordingly, the coupling by the new terminal 2 to the host AP 1 is resumed. Thereafter, the processing that is illustrated in FIG. 23 ends.

Figure 24:
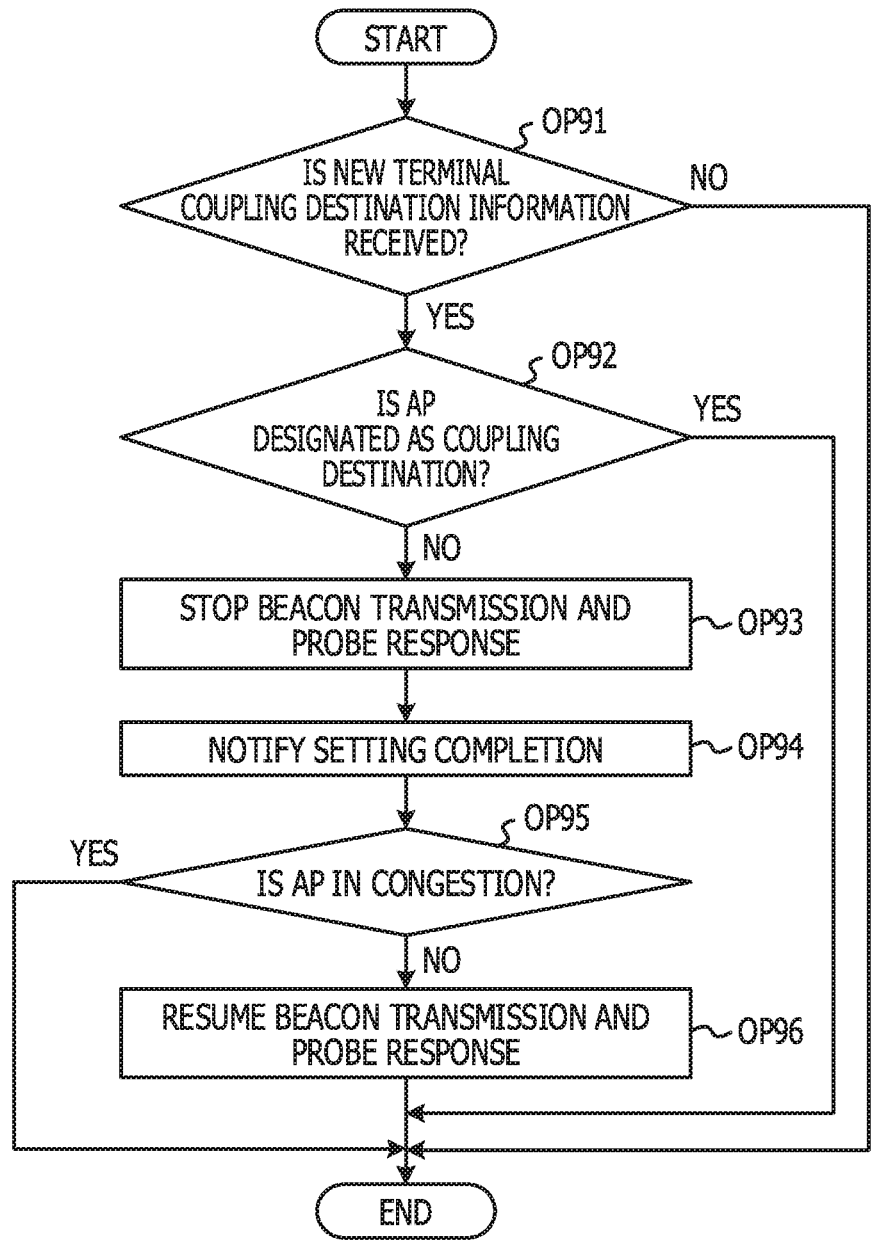
FIG. 24 is a flowchart of an example of the processing that, according to the third embodiment, is performed by the AP control unit when the terminal wireless communication IF does not detect the congestion.

FIG. 24 is an example of a flowchart of the processing that, according to the third embodiment, is performed by the AP control unit 107 when the terminal wireless communication IF 101 does not detect the congestion. The processing that is illustrated in FIG. 24 starts together with the activation of the AP 1, and is repeatedly performed while the AP 1 is in operation.

In OP91, in a case where the AP control unit 107 receives new terminal coupling destination information from the in-congestion AP 1 through the AP communication IF 103 (Yes IN OP91), the processing proceeds to OP92. In a case where the new terminal coupling destination information is not received, (No in OP91), the processing that is illustrated in FIG. 24 ends, and again starts.

In OP92, with the new terminal coupling destination information, the AP control unit 107 determines whether or not the host AP 1 is designated as the coupling destination, that is, whether or not the identifier of the host AP 1 is included in the new terminal coupling destination information. In a case where with the new terminal coupling destination information, the host AP 1 is designated as the coupling destination (Yes in OP92), the processing that is illustrated in FIG. 24 ends. In a case where with the new terminal coupling destination information, the host AP 1 is not designated as the coupling destination (No in OP92), the processing proceeds to OP93.

In OP93, the AP control unit 107 instructions the beacon control unit 111 and the probe response control unit 110 to stop the beacon transmission and the transmission of the probe response, respectively, with the terminal wireless communication IF 101. Accordingly, the new terminal 2 is suppressed from newly performing coupling to the host AP 1. Next, the processing proceeds to OP94.

In OP94, the AP control unit 107 transmits the setting completion notification that the setting in accordance with the new terminal coupling destination information is completed, to the in-congestion AP 1 through the AP communication IF 103. Next, the processing proceeds to OP95.

In OP95, the AP control unit 107 determines whether or not the utilization channel for the terminal wireless communication IF 101 of the host AP 1 is in congestion. In the case where the utilization channel for the terminal wireless communication IF 101 of the host AP 1 is in congestion (Yes in OP95), the processing that is illustrated in FIG. 24 ends and instead the processing that is illustrated in FIG. 23 starts. In the case where the utilization channel for the terminal wireless communication IF 101 of the host AP 1 is not congested (No in OP95), the processing proceeds to OP96.

In OP96, the AP control unit 107 instructs the beacon control unit 111 and the probe response control unit 110 to start the beacon transmission and the probe response, respectively, with the terminal wireless communication IF 101. This is because the utilization channel for the terminal wireless communication IF 101 is not congested and it is possible to accept a coupling by a new terminal 2. Accordingly, the coupling by the new terminal 2 to the host AP 1 is resumed. Thereafter, the processing that is illustrated in FIG. 24 ends and the processing again starts.

Operational Example

Figure 25:
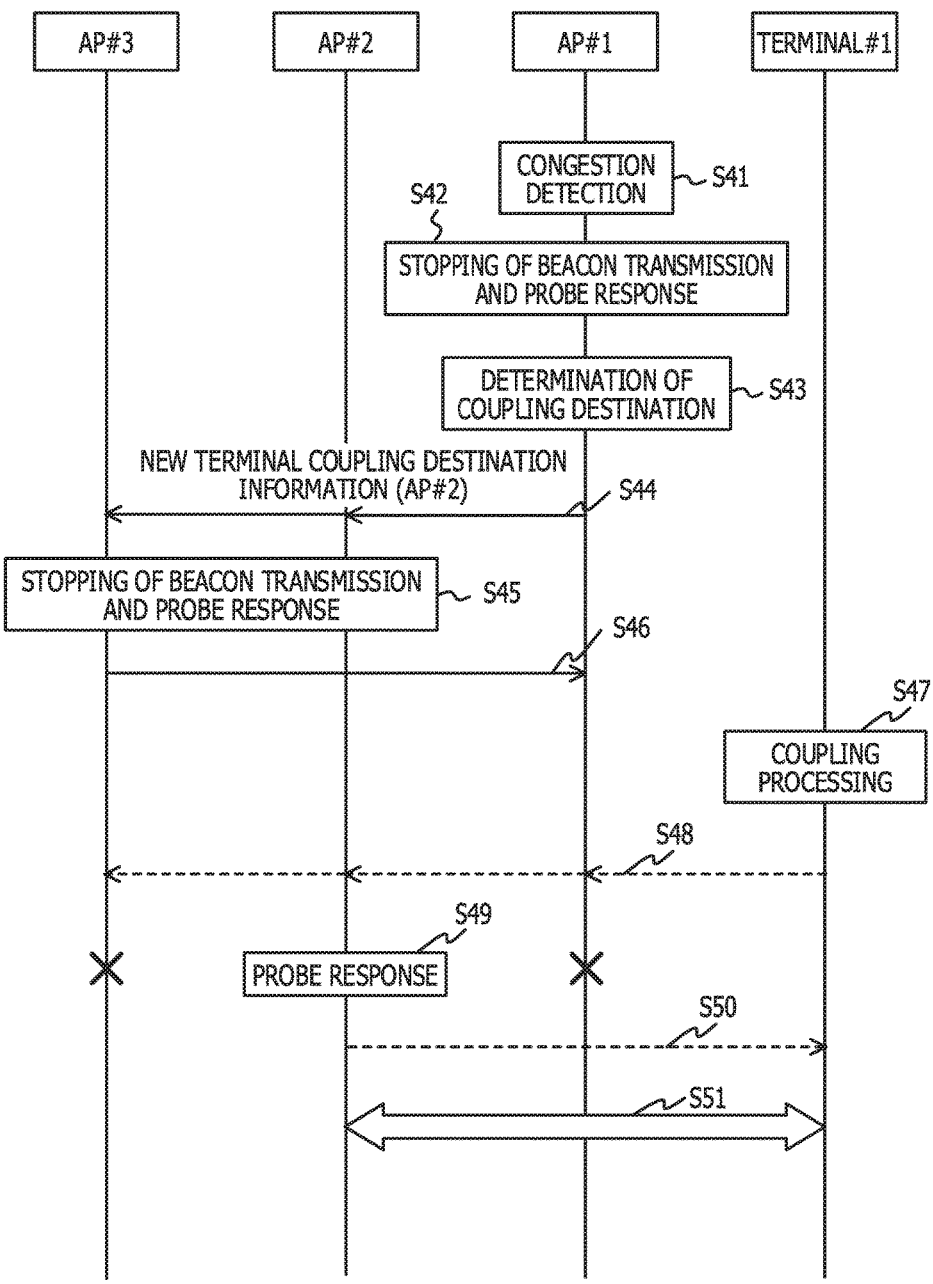
FIG. 25 is a diagram illustrating an example of a sequence of terminal coupling control processing according to the third embodiment.

FIG. 25 is a diagram illustrating an example of a sequence of terminal coupling control processing according to the third embodiment. In FIG. 25, the wireless communication network system 100 that is illustrated in FIG. 1 is assumed.

In S41, the AP #1 detects the congestion in the utilization channel for the terminal wireless communication IF 101. In S42, the AP #1 stops the beacon transmission and the transmission of the probe response from the terminal wireless communication IF 101 (OP81 in FIG. 23).

In S43, the AP #1 determines the coupling destination of a new terminal 2 (OP82 in FIG. 23). The AP #1 is assumed to select the AP #2 as the coupling destination of the new terminal 2.

In S44, the AP #1 transmits a new terminal coupling destination information (OP83 in FIG. 23). The identifier of the AP #2 is included in the new terminal coupling destination information that is transmitted from the AP #1 in S44. The new terminal coupling destination information may be transmitted by an one of broadcasting, multicasting, and unicasting.

In S45, each of the AP #2 and the AP #3 receive the new terminal coupling destination information (Yes in OP91 in FIG. 24). Because with the new terminal coupling destination information, the AP #3 is not designated as the coupling destination of a new terminal 2 (No in OP92 in FIG. 24), the AP #3 stops the beacon transmission and the transmission of the probe response with the terminal wireless communication IF 101 in order for the new terminal 2 not to perform coupling (OP93 in FIG. 24). Because with the new terminal coupling destination information, the AP #2 is designated as the coupling destination of the new terminal 2 (Yes in OP92 in FIG. 24), the AP #2 does not stop the beacon transmission and the transmission of the probe response in such a manner that the new terminal 2 can perform coupling.

In S46, the AP #3 transmits the setting completion notification to the AP #1 (OP94 in FIG. 24). Moreover, the setting completion notification is transmitted by unicasting with the AP #1 as the destination.

In S47, a new terminal #1 that does not perform coupling to any AP 1 starts the coupling processing. In S48, as one of the coupling processing operations, the terminal #1 transmits the probe request on the utilization channel for the terminal wireless communication IF 101 of any one of the AP #1, and the AP #2, and the AP #3.

In S49, the AP #2 receives the probe request from the terminal #1, and transmits the probe response to the terminal #1. Although the AP #1 and the AP #3 receives the probe request from the terminal #1, because the transmission of the probe response is stopped, the probe response is not transmitted to the terminal #1.

In S50, the terminal #1 receives the probe response from the AP #2. Because the probe response is not transmitted from the AP #1 and the AP #3 to the terminal #1, the terminal #1 recognizes the presence of the AP #2, but does not recognize the presence of the AP #1 and the AP #3. In S51, the terminal #1 performs coupling to the AP #2 of which the presence the terminal #1 recognizes.

<Operational Effect of the Third Embodiment>

In an example that is illustrated in FIG. 25, when the congestion is detected, the in-congestion AP #1 stops the probe response of the host AP 1 and designates the AP #2 that is not congested, as the coupling destination of a new terminal 2. The AP #3 that is not designated stops the probe response, and the designated AP #2 replies to the probe request form the terminal 2. Accordingly, the new terminal 2 performs coupling to the AP #2 that is not congested, and the concentration of the coupling by the terminals on the AP #1 is suppressed.

According to the third embodiment, the AP 1 determines the notification congestion level based on the current congestion level and the past congestion level. For example, in a case where the host AP 1 neither has the history indicating that the host AP 1 was in congestion for the same period of time in the past as the current period of time, nor is in congestion, the AP 1 determines the notification congestion level, with a value smaller than the congestion level that is notified by a different AP 1 that has the history indicating that the different AP 1 was in congestion for the same period of time in the past. The AP 1 that has the history indicating that the AP 1 was in congestion for the same period of time in the past is expected to be also in congestion for the current period of time. The likelihood that the designation as the coupling destination of a new terminal 2 will be performed is increased by notifying that the congestion level is lower than that of the AP 1 that is expected to be congested. Accordingly, the coupling by new terminals 2 is distributed to the APs 1 that are not expected to be congested, and the coupling to the AP 1 that is expected to be congested is suppressed.

Moreover, according to the third embodiment, the AP 1 that is not designated with new terminal coupling destination information stops the transmission of the probe response and of the beacon without any change. After a given time has elapsed from when the transmission of the probe response and the beacon transmission was stopped, the AP 1 may resume the transmission of the probe response and the beacon transmission. The given time from the stopping of the transmission of the probe response and the beacon transmission to the resumption thereof is arbitrarily set by the manager. The given time is, for example, one minute or approximately several minutes.

Modification Examples of the First to Third Embodiments

According to the first to third embodiments, each AP 1 individually performs processing that determines the coupling destination of the terminal 2. In contrast, a master-slave type system configuration may be employed in which a server that generally manages all APs 1 performs the processing by the terminal 2, which determines the coupling destination. In this case, the server performs processing that is performed by each of the AP control unit 107 and the coupling destination determination unit 108.

Figure 26:
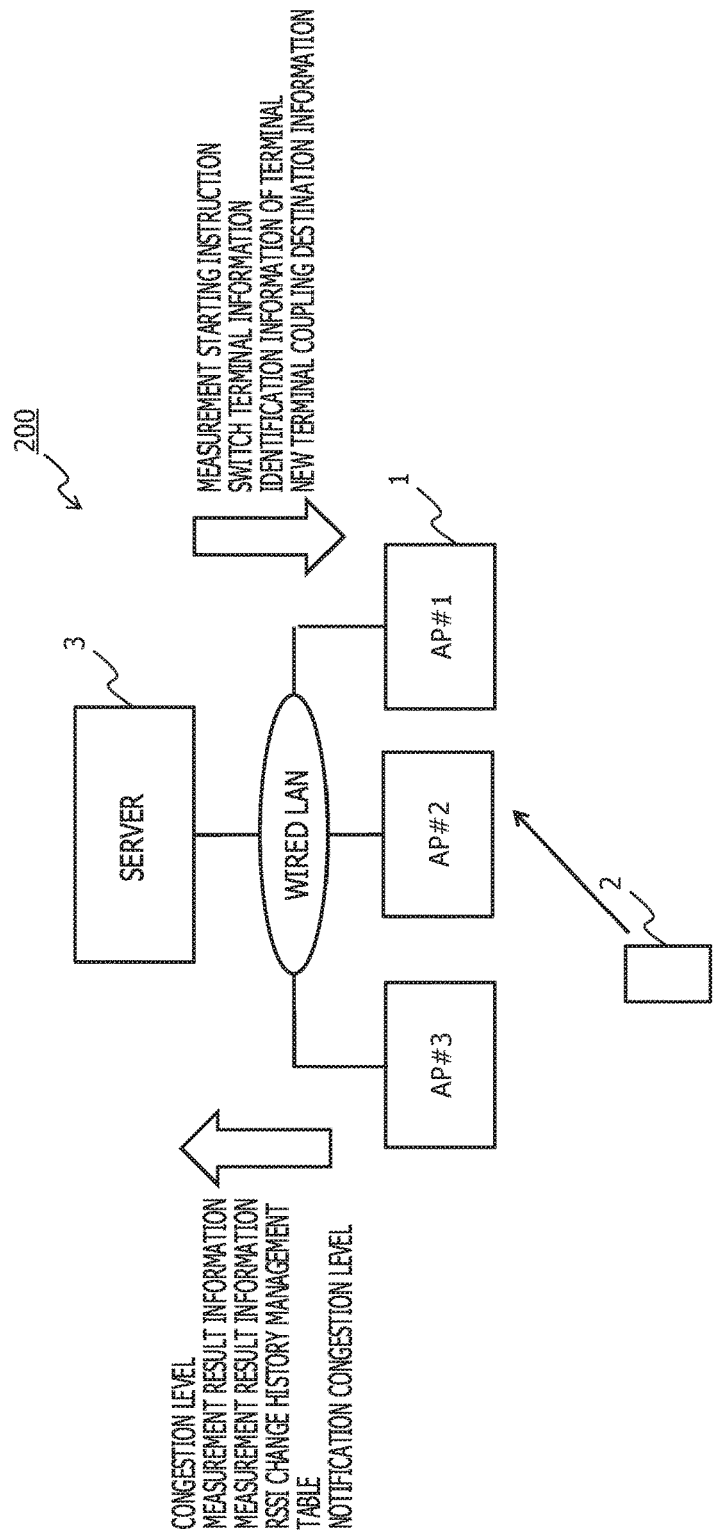
FIG. 26 is a diagram illustrating an example of a system configuration of a wireless communication network system according to a modification example of each of the first to third embodiments.

FIG. 26 is a diagram illustrating an example of a system configuration of a wireless communication network system 200 according to a modification example of each of the first to third embodiments. The wireless communication network system 200 includes the multiple APs 1, the terminal 2 that performs coupling to any one of the multiple APs 1 and performs communication, and a server 3 that generally manages the multiple APs 1. In terms of a hardware configuration, the server 3 is, for example, an information processing apparatus that includes a CPU, a memory, an ancillary storage device, and a network interface. Furthermore, the server 3 includes a terminal coupling control program in the auxiliary storage device. By executing the program, the server 3 performs the processing that is performed by each of the AP control unit 107 and the coupling destination determination unit 108. The server is an example of a "communication apparatus".

For example, according to the first embodiment, each AP 1 transmits the congestion level to the server 3 with a given period. When the congestion level that is the congestion threshold or above is detected, each AP 1 notifies the server 3 of the congestion detection. When receiving the notification of the congestion detection from the in-congestion AP 1, the server 3 notifies a different AP 1 of the instruction that causes the received electromagnetic wave strength on the utilization channel for the in-congestion AP 1 to start to be measured. The server 3 receives the measurement terminal information from the different AP 1, determines the coupling destination switching target terminal and the AP 1 that is the next coupling destination, based on the measurement terminal information, and transmits the switch terminal information to each AP 1.

According to the switch terminal information from the server 3, the AP 1 is set in such a manner that the AP 1 stops the probe response if the AP 1 is not designated as the next coupling destination and the AP 1 replies to the probe request if the AP 1 is designated as the next coupling destination. When receiving the switch terminal information from the server 3, the in-congestion AP 1 releases a coupling to the designated terminal and stops the probe response.

For example, according to the second embodiment, when receiving from the AP 1 the notification that the terminal 2 moves, the server 3 makes a request to a different AP 1 for the RSSI change history management table of that terminal 2, receives the RSSI change history management table, determines the next coupling destination based on that table, and transmits the switch terminal information to each AP 1. The operation of each AP 1 is the same as in the first embodiment.

For example, according to the third embodiment, with a given period, each AP 1 determines the notification congestion level and notifies the server 3 of the notification congestion level. When receiving the notification of the congestion detection from the in-congestion AP 1, the server 3 determines the AP 1 that is the next coupling destination of a new terminal 2 and notifies each AP 1 of new terminal coupling destination information. The AP 1 that is not designated with the new terminal coupling destination information stops a probe response.

According to any one of the embodiments, realization is possible by notifying the server 3 of information that is exchanged between the APs 1 and by the server 3 retaining information that is used according to each of the embodiments. According to the first embodiment, for example, the server 3 may retain the congestion level of each AP 1, identification information of the terminal that performs coupling to the in-congestion AP 1, the measurement terminal information of the received electromagnetic wave strength on a designated channel, and the like. According to the second embodiment, the server 3 may retain the congestion level of each AP 1 and a result of the measurement of the received electromagnetic wave strength on each utilization channel for the AP 1 in the vicinity, the identification information of the terminal of which the movement is detected, and pieces of information such as positional information of each AP 1. According to the third embodiment, the server 3 may retain the congestion level of each AP 1 and pieces of information such as the history of the congestion level of each AP 1.

The server 3 performs the processing that is performed by each of the AP control unit 107 and the coupling destination determination unit 108, and thus a load of terminal coupling control processing does not have to be placed on the AP 1. For this reason, the AP 1 can reassign as a resource for the unnecessary terminal coupling control processing to the processing for the coupling by the terminal 2. Furthermore, according to the first embodiment and the third embodiment, because the in-congestion AP 1 performs the processing that determines the AP 1 which is the coupling destination, the server is instead made to perform that determination processing. Thus, an effect of alleviating a load on the operation of the in-congestion AP 1 is remarkable.

Moreover, one AP 1 of the APs 1 within the wireless communication network system 100, as a master, may operate as the server described above without introducing the server. The AP 1 that operates as the master is an example of a "communication apparatus".

Other Modification Examples

According to the first to third embodiments, for wireless communication network system 100, a network is assumed as the wireless LAN, but the assumed network is not limited to the wireless LAN. The wireless communication network system 100 may be a network such as 3G or Long Term Evolution (LTE). In a case where the wireless communication network system 100 is the network such as the 3G or the LTE, a "wireless base station" is a base station. Furthermore, the wireless communication interfaces 15A and 15B are wireless communication circuits for the 3G and the LTE. Furthermore, instead of the probe request and the probe response on the wireless LAN, an acknowledgment request and an acknowledgment in the 3G and the LTE that are equivalent to the probe request and the probe response are used.

Furthermore, for the first to third embodiments, combinations of the embodiments are also possible. For example, the notification congestion level according to the third embodiment may be introduced into the first embodiment or the second embodiment. Accordingly, the switching to the coupling by the terminal 2 to the AP 1 that holds the record indicating that the congestion was detected in the past is suppressed, and the congestion level of that AP 1 is suppressed from being raised.

The first to third embodiments, for example, is able to be also applied to a wireless communication network system including an AP 1 that is installed a moving object such as a train.

<Recording Medium>

A program that realizes any one of the functions described above on a computer, and on a machine and an apparatus other than the computer (which are hereinafter referred to as the computer or the like) can be recorded on a computer-readable recording medium. The computers are caused to read and execute the program on the recording medium, and thus the functions described above can be provided.

The recording medium that is readable by the computers refers to a non-temporary recording medium in which pieces of information, such as data and a programs, are accumulated by performing an electrical, magnetic, optical, mechanical, or chemical operation and which can be read from the computers. Among these recording media, media that are removable from the computers include, for example, a flexible disk, a magneto-optical disk, a CD-ROM, a CD-R/W, a DVD, a Blu-ray disk, a DAT, an 8 mm tape, and a memory card such as a flash memory. Furthermore, the recording media that are fixed to the computers includes a hard disk and a read only memory (ROM). Additionally, a solid state drive (SSD) is used not only as a recording medium that is removable from the computers, but also as a recording medium that is fixed to the computers.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method using a plurality of access points including a first access point and a second access point, the method comprising:
    measuring congestion levels of each of the plurality of access points, the congestion levels including a first congestion level of the first access point coupled to a plurality of terminal devices;
    determining, based on the measured first congestion level, to change a coupling destination of at least one of the plurality of terminal devices from the first access point to the second access point, a second congestion level of the second access point being less than the first congestion level;
    transmitting, from the second access point to the first access point, information indicating electromagnetic wave strengths of signals transmitted from the second access point to the plurality of terminal devices;

selecting, based on the information, a first terminal device from among the plurality of terminal devices,
an electromagnetic wave strength of a signal to the first terminal device being over a certain value, from among the electromagnetic wave strengths of signals transmitted from the second access point, based on the information;

transmitting a first request from the first access point to the plurality of access points, the first request from the first access point requesting the plurality of access points other than the second access point not to send a response to a second request from the first terminal device, the second request from the first terminal device requesting the plurality of access points to send the response to the first terminal device;

cutting off a coupling between the first access point and the first terminal device;

transmitting the second request from the first terminal device to the plurality of access points;

sending, from the second access point, the response to the second request from the first terminal device; and establishing a coupling between the second access point and the first terminal device.

2. The method according to claim 1,
wherein the first congestion level of the first access point is measured based on at least one of the plurality of terminal devices coupled to the first access point and an electromagnetic wave occupancy rate of the plurality of terminal devices.

3. The method according to claim 2, further comprising:
measuring the second congestion level of the second access point; and
selecting the second access point from the plurality of access points based on the measured second congestion level as the coupling destination.

4. The method according to claim 3, further comprising:
receiving, by the first access point, the electromagnetic wave strength on a utilization frequency for wireless communication from the second access point,
wherein the second access point is selected as the coupling destination based on the second congestion level and the received electromagnetic wave strength.

5. The method according to claim 3, wherein
the plurality of access points further includes a third access point, and
the second congestion level is lower than a third congestion level of the third access point.

6. The method according to claim 4, further comprising:
when the first congestion level is equal to or more a threshold, transmitting, from the first access point to the second access point, an instruction that instructs to measure the electromagnetic wave strength.

7. The method according to claim 1, further comprising:
obtaining, by the first access point, a communication application that is used by the first terminal device, and a remaining capacity of a battery of the first terminal device; and
selecting the first terminal device from the plurality of terminal devices coupling to the first access point, based on the communication application and the remaining capacity of the battery.

8. The method according to claim 3, further comprising:
obtaining, by the first access point, a movement speed of the first terminal device and a movement direction of the first terminal device,
wherein the second access point is selected as the coupling destination based on the movement speed and the movement direction.

9. The method according to claim 1,
wherein the first access point is configured not to send the response to the second request from the first terminal device.

10. A system comprising:
a plurality of access points including a first access point and a second access point, wherein
the first access point includes a first memory and a first processor coupled to the first memory, wherein the first processor is configured to:
obtain congestion levels of each of the plurality of access points, the congestion levels including a first congestion level of the first access point coupled to a plurality of terminal devices,
determine, based on the first congestion level, to change a coupling destination of at least one of the plurality of terminal devices from the first access point to the second access point, a second congestion level of the second access point being less than the first congestion level,
obtain, from the second access point, information indicating electromagnetic wave strengths of signals transmitted from the second access point to the plurality of terminal devices,
select, based on the information, a first terminal device from among the plurality of terminal devices,
an electromagnetic wave strength of a signal to the first terminal device being over a certain value, from among the electromagnetic wave strengths of signals transmitted from the second access point, based on the information,
transmit a first request to the plurality of access points other than the second access point, the first request from the first access point requesting the plurality of access point other than the second access point not to send a response to a second request from the first terminal device, the second request from the first terminal device requesting the plurality of access points to send the response to the first terminal device, and
cut off a coupling between the first access point and the first terminal device, and
the second access point includes a second memory and a second processor coupled to the second memory, wherein the second processor is configured to:
receive the second request from the first terminal device,
send the response to the second request, and
establish a coupling between the second access point and the first terminal device.

11. The system according to claim 10,
wherein the first congestion level of the first access point is measured based on at least one of the plurality of terminal devices coupled to the first access point and the electromagnetic wave occupancy rate of the plurality of terminal devices.

12. The system according to claim 11, wherein the first processor is further configured to:
acquire the second congestion level of the second access point, and
select the second access point from the plurality of access points based on the measured second congestion level as the coupling destination.

13. The system according to claim 12, wherein the first processor is further configured to:
receive the electromagnetic wave strength on a utilization frequency for wireless communication from the second access point,
wherein the second access point is selected as the coupling destination based on the second congestion level and the received electromagnetic wave strength.

14. The system according to claim 13, wherein
the plurality of access points further includes a third access point, and
the second congestion level is lower than a third congestion level of the third access point.

15. An access point comprising:
a memory; and
a processor coupled to the memory and configured to:
  obtain congestion levels of each of the plurality of access points, the congestion levels including a first congestion level of the access point coupled to a plurality of terminal devices,
  determine, based on the first congestion level, to change a coupling destination of at least one of the plurality of terminal devices from the access point to another access point included in a plurality of access points, a second congestion level of the second access point being less than the first congestion level,
  obtain, from the second access point, information indicating electromagnetic wave strengths of signals transmitted from the second access point to the plurality of terminal devices,
  select, based on the information, a first terminal device from among the plurality of terminal devices,
    an electromagnetic wave strength of a signal to the first terminal device being over a certain value, from among the electromagnetic wave strengths of signals transmitted from the second access point, based on the information,
  transmit a first request from the access point to the plurality of access points, the first request requesting the plurality of access points other than the another access point not to send a response to a second request from the first terminal device, the second request from the first terminal device requesting the plurality of access points to send the response to the first terminal device, and
  cut off a coupling between the access point and the first terminal.

16. The access point according to claim 15,
wherein the first congestion level of the access point is measured based on at least one of the plurality of terminal devices coupled to the access point and an electromagnetic wave occupancy rate of the plurality of terminal devices.

17. The access point according to claim 16, wherein the processor is further configured to:
measure the second congestion level of the another access point, and
select the another access point from the plurality of access points based on the measured second congestion level as the coupling destination.

18. The access point according to claim 17, wherein the processor is further configured to:
receive the electromagnetic wave strength on a utilization frequency for wireless communication from the another access point,
wherein the another access point is selected as the coupling destination based on the second congestion level and the received electromagnetic wave strength.

19. The access point according to claim 17, wherein
the plurality of access points further includes a further another access point, and
the second congestion level is lower than a third congestion level of the further another access point.

* * * * *